Aug. 1, 1961 J. M. GARTNER 2,994,749
SEQUENTIAL CONTROLLER
Filed May 6, 1959 15 Sheets-Sheet 1
Fig. 1
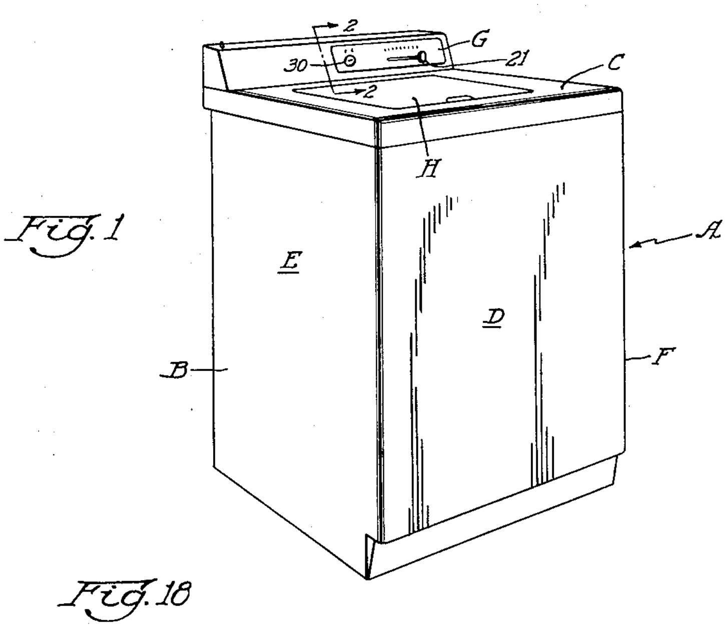
Fig. 18
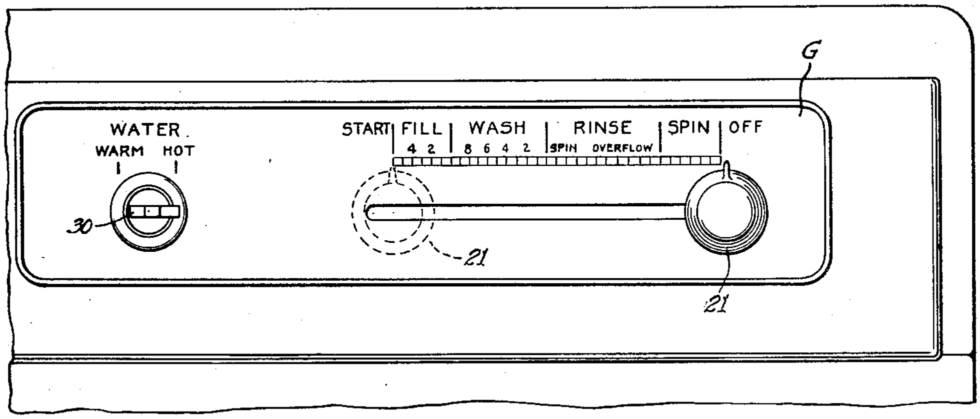
Fig. 16
| CYCLE | |
|---|---|
| 4 MIN. | FILL - ADJUSTABLE 3 TO 6 MIN. |
| 10 " | WASH |
| 1/2 " | OFF |
| 1 " | EXTRACT |
| 1/2 " | SPIN RINSE (RINSE WATER) |
| 3 1/2 " | FILL |
| 4 " | AGITATED OVERFLOW RINSE (RINSE WATER) |
| 1 " | AGITATED RINSE WITHOUT OVERFLOW |
| 1/2 " | OFF |
| 1 " | EXTRACT |
| 1/2 " | SPIN RINSE (RINSE WATER) |
| 6 " | EXTRACT |
| Total 32 1/2 | |
Inventor:
Joseph M. Gartner
By: C. G. Stallings
Atty.

Aug. 1, 1961 J. M. GARTNER 2,994,749

SEQUENTIAL CONTROLLER

Filed May 6, 1959 15 Sheets-Sheet 2

Inventor:
Joseph M. Gartner
By: [signature] Atty.

Aug. 1, 1961 J. M. GARTNER 2,994,749

SEQUENTIAL CONTROLLER

Filed May 6, 1959 15 Sheets-Sheet 3

Inventor:
Joseph M. Gartner
By: C. G. Stallings Atty.

Aug. 1, 1961 J. M. GARTNER 2,994,749

SEQUENTIAL CONTROLLER

Filed May 6, 1959 15 Sheets-Sheet 4

Inventor:
Joseph M. Gartner
By: C. G. Stallings
Atty.

Inventor:
Joseph M. Gartner
By: C. G. Stallings
Atty.

Aug. 1, 1961 J. M. GARTNER 2,994,749

SEQUENTIAL CONTROLLER

Filed May 6, 1959 15 Sheets-Sheet 6

Inventor:
Joseph M. Gartner
By: C. J. Hallenbeck
Atty.

Inventor:
Joseph M. Gartner
By: C. G. Stallings
Atty.

SEQUENTIAL CONTROLLER

Filed May 6, 1959 15 Sheets-Sheet 8

Inventor:
Joseph M. Gartner
By: C. G. Stalling
Atty.

Inventor:
Joseph M. Gartner
By: C. J. Stallings
Atty.

Aug. 1, 1961 J. M. GARTNER 2,994,749

SEQUENTIAL CONTROLLER

Filed May 6, 1959 15 Sheets-Sheet 10

Inventor:
Joseph M. Gartner
By: C. G. Stallings
Atty.

Aug. 1, 1961 J. M. GARTNER 2,994,749

SEQUENTIAL CONTROLLER

Filed May 6, 1959 15 Sheets-Sheet 11

Inventor:
Joseph M. Gartner
By: C. G. Stallings
Atty.

Aug. 1, 1961 J. M. GARTNER 2,994,749

SEQUENTIAL CONTROLLER

Filed May 6, 1959 15 Sheets-Sheet 12

Inventor:
Joseph M. Gartner
By: C. G. Stallings
Atty.

Aug. 1, 1961

J. M. GARTNER 2,994,749

SEQUENTIAL CONTROLLER

Filed May 6, 1959

15 Sheets-Sheet 13

Inventor:
Joseph M. Gartner
By: C. G. Stallings
Atty.

SEQUENTIAL CONTROLLER

Filed May 6, 1959 15 Sheets-Sheet 14

Inventor:
Joseph M. Gartner
By: [signature] Atty.

Inventor:
Joseph M. Gartner
By: [signature] Atty.

2,994,749
Patented Aug. 1, 1961

2,994,749
SEQUENTIAL CONTROLLER

Joseph M. Gartner, Riverside, Ill., assignor to Borg-Warner Corporation, Chicago, Ill., a corporation of Illinois Filed May 6, 1959, Ser. No. 811,436
13 Claims. (Cl. 200—33)

This invention relates to sequential controllers, and more particularly to electric control mechanism for regulating the operation of a machine in a predetermined sequence or cycle, such as for example, an automatic washing machine, domestic appliances, industrial machinery and the like.

This application is a continuation-in-part of my co-pending application for "Sequential Controller," Serial No. 262,760, filed December 21, 1951, now abandoned.

Otherwise stated, the invention is concerned with a sequential controller wherein the indicating and selector mechanism is movable in a linear path as distinguished from the conventional well-known rotary type sequential controllers of this class, said arrangement being particularly characterized in providing and facilitating convenient visual review of the relative position of the indicating or selector mechanism with respect to the horizontally or vertically disposed and linearly arranged dial upon which the various sequences of operation are inscribed.

More specifically stated, this invention is embodied in an improved control which is relatively simple in structure and comprises a minimum number of parts, but which at the same time performs all the needed functions in a satisfactory and reliable manner.

An object and accomplishment of the invention is to provide an automatic cyclic control switch of the type which is motor driven and which is also provided with manual means, such as a knob, arranged for movement in a linear path on a substantially horizontal plane for advancing the switch to shorten one or more of the periods of the cycle, said knob also being adapted for movement in both directions without danger to damage electrical contacts and other attendant mechanism.

Heretofore, in conventional rotary type timers, the control knob could only be rotated forwardly in one direction and in the event an unskilled operator rotated the dial in a reverse direction there appeared a danger of damage to the electrical contacts, said danger being removed from the present invention in that the indicating means or selector mechanism may be moved in either direction in a linear path on a substantially horizontal plane if the controller mechanism is disposed horizontally with respect to the adjunctive machinery and in a substantially vertical plane in the event that the controller mechanism is disposed in a vertical position with respect to the adjunctive mechanism.

In one possible use of the invention, for example, the control may be employed to regulate the various operations of an automatic washing machine. In an automatic washing machine, there are a number of successive operations involved in a complete washing cycle which may comprise soaking, rinsing, washing, one or more additional rinsings, and spinning, that is to say, centrifugal drying. In order to accommodate a machine of this character to the various types of articles being washed and to their particular condition, it is desirable to be able to select one or more of the different operations, to be able to select different time cycles for one or more of the operations, and also to select a desirable temperature of the washing water. While heretofore there have been proposed a number of timing mechanisms which have had successful application in the past and were intended for automatically controlling a washing machine or a dish washer, or the like, such mechanisms now lack the desirable flexibility required for present day patterns of cyclic operations.

In this connection, it is an object and accomplishment of the invention to provide a new and improved sequential controller mechanism which is of general application and also which is particularly suitable for timing the several operations of present day automatic washing machines or dish washers and the like involving additional sequences of operation heretofore not found in such prior art machines.

Another object and accomplishment of the invention is to provide a new and improved sequential controller mechanism by means of which there can be set up in advance a complete program or washing cycle, including one or more successive operations of soaking, rinsing, washing, rinsing, drying, etc.

It is a further object of the invention to provide a new and improved sequential controller mechanism having indicating mechanism movable in either direction in a linear path for setting up in advance a program of the type described but in which the time cycle of one or more of the operations may be varied in accordance with the requirements of the articles being washed.

Another object and accomplishment of the invention is to provide a sequential controller wherein a traveling contact in a linear path engages stationary contact means and wherein there is provision for longitudinal adjustment of the traveling contact and the stationary means may be varied as desired. A further object of the invention is to provide a novel sequential controller having indicating means movable in a linear path in either direction for convenient visual review and which is economical to manufacture, simple to operate, substantially free from noise and vibration and yet rugged and reliable in use.

Present day automatic washers have incorporated therein means such as an electrically controlled valve for filling the washing machine tub with water. In general, it may be stated that two methods to effect filling of the washer tub with water are recognized, one of which being the so-called float type which employs a float mechanism having an electrical switch adapted to be opened after a predetermined quantity of water is disposed in the washing machine tub, and the other of which is the so-called timed type which employs a specially electrically operated valve arranged to permit a predetermined flow of water per minute to flow therethrough regardless of water main pressures thereby to fill the water tub by time as distinguished from the float type hereinbefore described.

In this connection, it is an important object and accomplishment of the invention to provide means associated with the sequential control to accomplish changes in the timed sequence portion of the filling cycle thereby to conveniently regulate and effect the desired amount of water in the washing machine tub, thereby providing a highly desirable versatility to the washing machine and whereby the washing machine may accommodate and be advantageously employed to wash different types of clothes and other articles desired to be cleansed which have different characteristics requiring different amounts of water for effectively accomplishing the cleansing operations thereon. Moreover, different levels of water in the tub may be important in various localities because of the different characteristics of water found throughout the country, that is to say, there may be hard water and soft water, each of which requires particular consideration of their different inherent characteristics in sudsing.

Thus, the invention contemplates the provision of means associated with the sequential controller to regulate the time of operation of an electrically operated water valve to determine the amount of water in the washer tub, said means being arranged for manual regulation whereby the time may be varied to provide different levels of water in the washing machine tub.

Although prior art sequential controllers of the rotary type and of this general class were successful in their operation, great expense was entailed in revamping the prior art sequential controller in the event that a change in any one or more of the stations would be required. Even a slight change required a substantial rebuilding of the prior art conventional rotary type sequential controller.

In this connection, it is another important object of the invention to provide a sequential controller adapted to overcome the aforementioned difficulties in that only relatively few inexpensive parts may be interchanged to effect a change in the cyclic program. From a manufacturing standpoint this versatility provides distinct advantages in that a substantial part of the instant sequential controller is considered standard and only the relatively inexpensive programming element need be changed to adapt the basic sequential controller for operation on different types of machinery or other equipment, each of which calls for a different sequence of operation in the cyclic program. From an assembly standpoint, the aforementioned advantages are obvious and substantial costs in the manufacture of sequential controllers according to the teachings of this invention would be effected.

While I have described and set forth as a matter of illustration the incorporation of the instant sequential controller in a washing machine, the invention contemplates the employment of the principles taught by this invention in a sequential controller for other types of machinery and other equipment wherein a regulated program of cyclic operation is desired.

In this connection and because of the versatility of the instant sequential controller and the convenient and advantageous interchangeability of program regulating elements in the basic sequential controller as hereinbefore described, it is another important object and accomplishment of the invention to provide a sequential controller wherein the program regulating elements are readily interchangeable so that the basic sequential controller may be employed respectively to control the operation of different types of mechanism and other machinery in a respective predetermined cyclic program of operation, said interchangeability of the programming elements being effected without necessitating a complete rebuilding of the basic sequential controller mechanism.

An ancillary object and accomplishment of the invention is to provide a new and improved sequential controller which is adapted to be economically manufactured and which is so designed as to permit the manufacture and assembly thereof in accordance with present day large scale mass production manufacturing methods of construction and assembly.

The invention seeks, as a final object and accomplishment, to provide a sequential controller of the character indicated and which is particularly characterized by a design arrangement to more advantageously and satisfactorily perform the functions required of it and adapted to provide a compact unit which will successfully combine the factors of structural simplicity and durability and yet be economical to manufacture.

Additional objects, features and advantages of the invention disclosed herein will be apparent to persons skilled in the art after the construction and operation are understood from the within description. It is preferred to accomplish the various objects of this invention and to practice the same in substantially the manner as hereinafter more fully described, and as more particularly pointed out in the appended claims.

Embodiments of the invention are illustrated in the accompanying drawings forming a part hereof and wherein:

FIG. 1 is a perspective view of an automatic washer with which the sequential controller embodying the features of the present invention may advantageously be employed;

Figure 15:
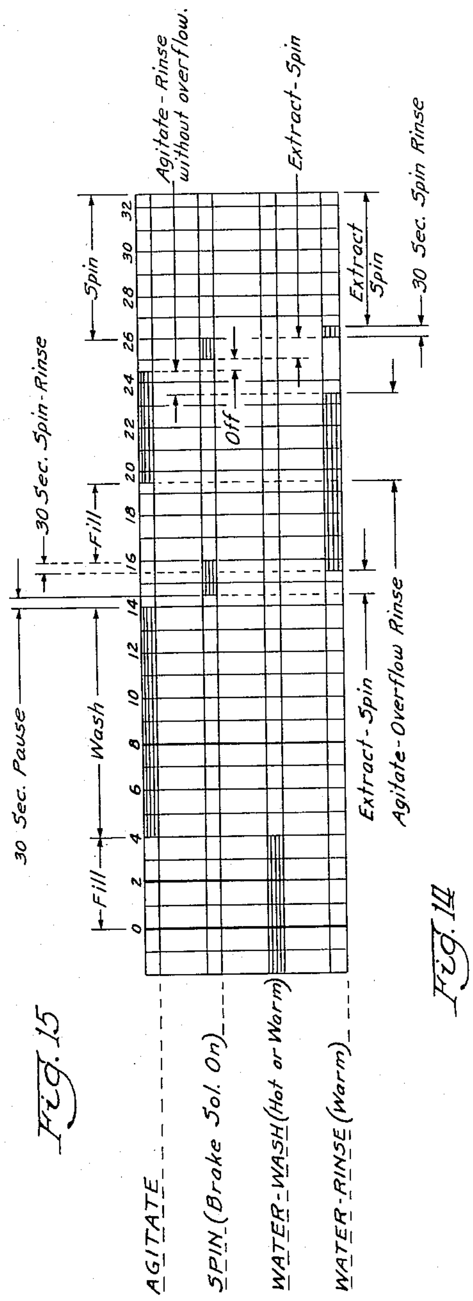
FIG. 15 illustrates a suggested scale for a cycle of washing operation when the sequential controller contemplated by this invention is employed adjunctively to an automatic washing machine.
Figure 17:
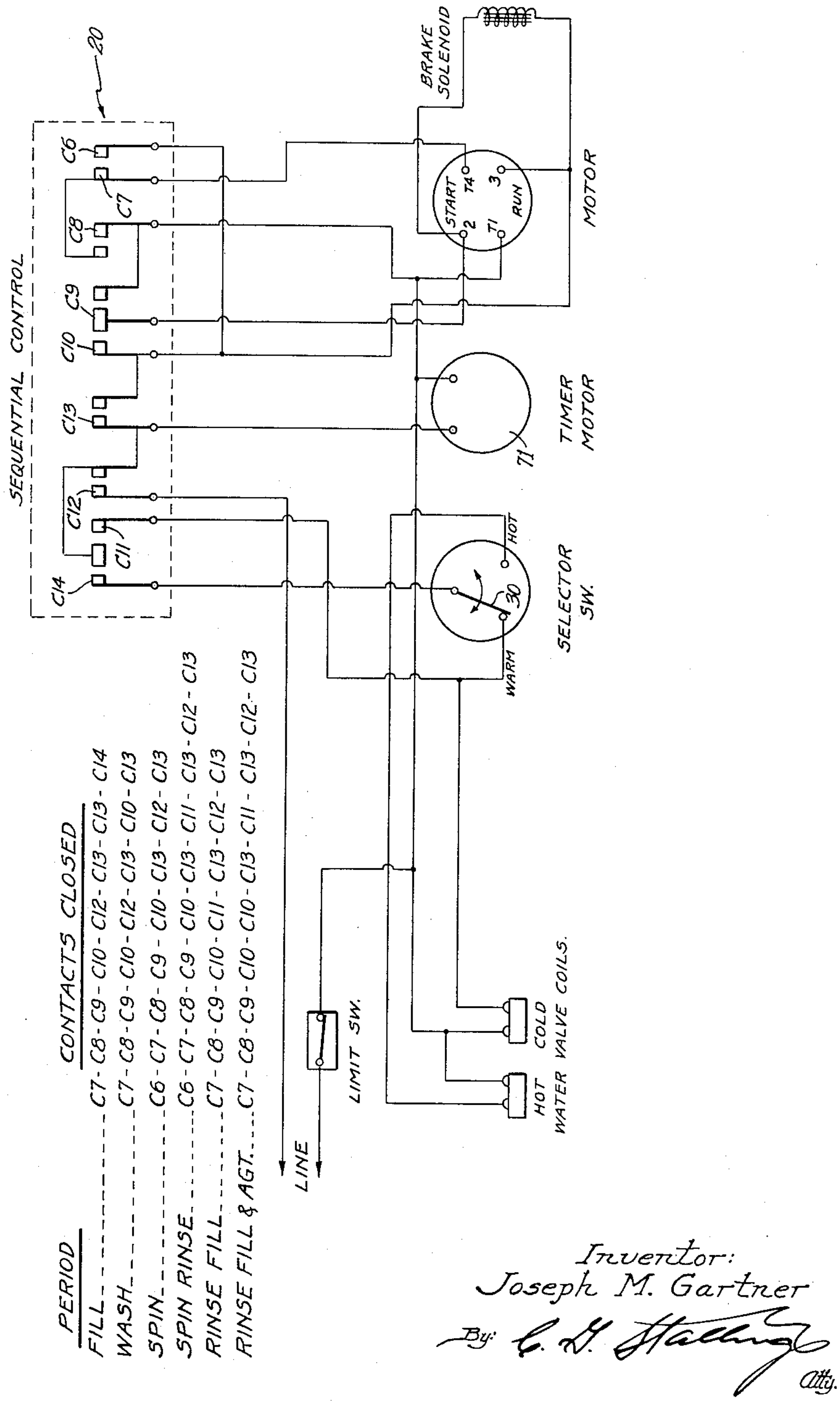

FIG. 16 sets forth a suggested cycle following the pattern of the cycle illustrated in FIG. 15;

FIG. 17 is a diagrammatic illustration of a suggested wiring diagram for an automatic washing machine in which the sequential control contemplated by this invention may be advantageously employed; and FIG. 18 is an elevational view of the indicating dial of the sequential controller contemplated by this invention.

Figure 19:
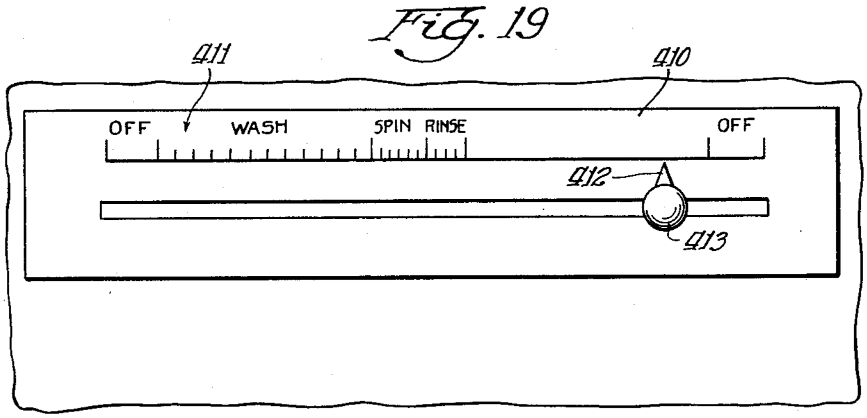
Figure 20:
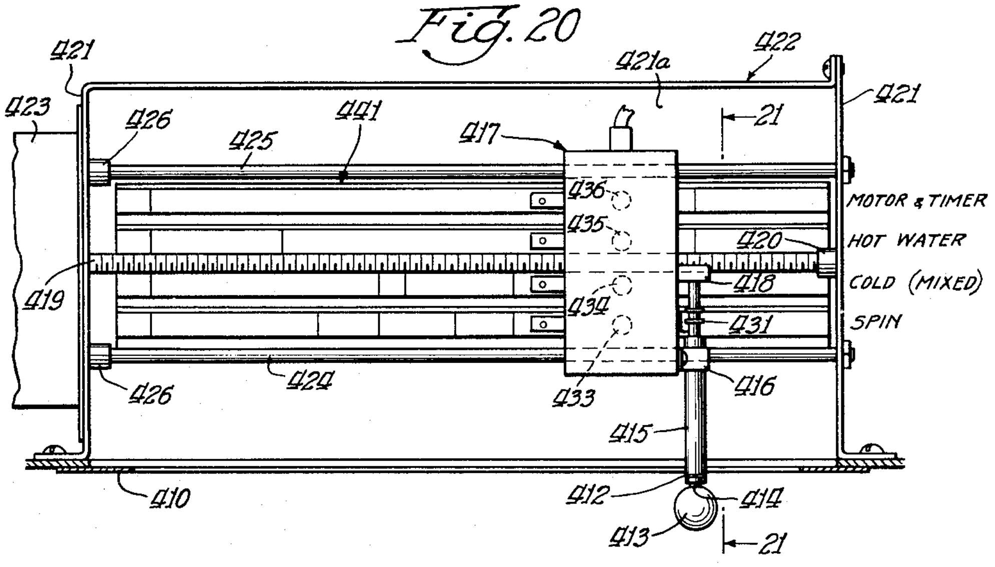
Figure 21:
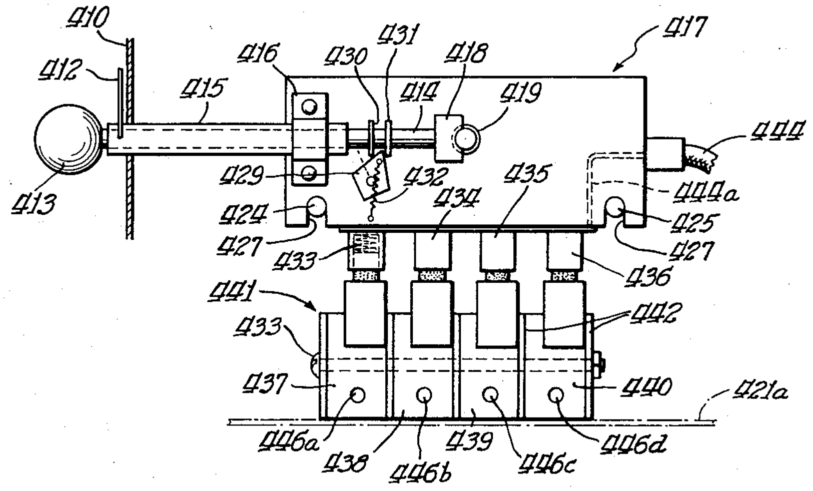
Figure 22:
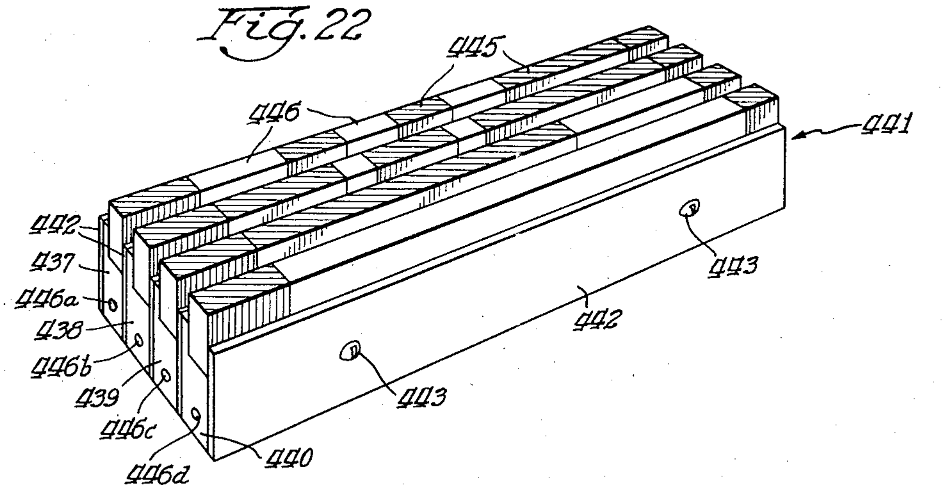

FIG. 19 is a front elevational view of a modification of a sequential controller;

FIG. 20 is a top plan view of the sequential controller shown in FIG. 19;

FIG. 21 is a sectional view of the sequential controller and taken substantially on the line 21—21 of FIG. 20;

FIG. 22 is a perspective view of a removable back plate having programming electrical control elements.

Figure 24:
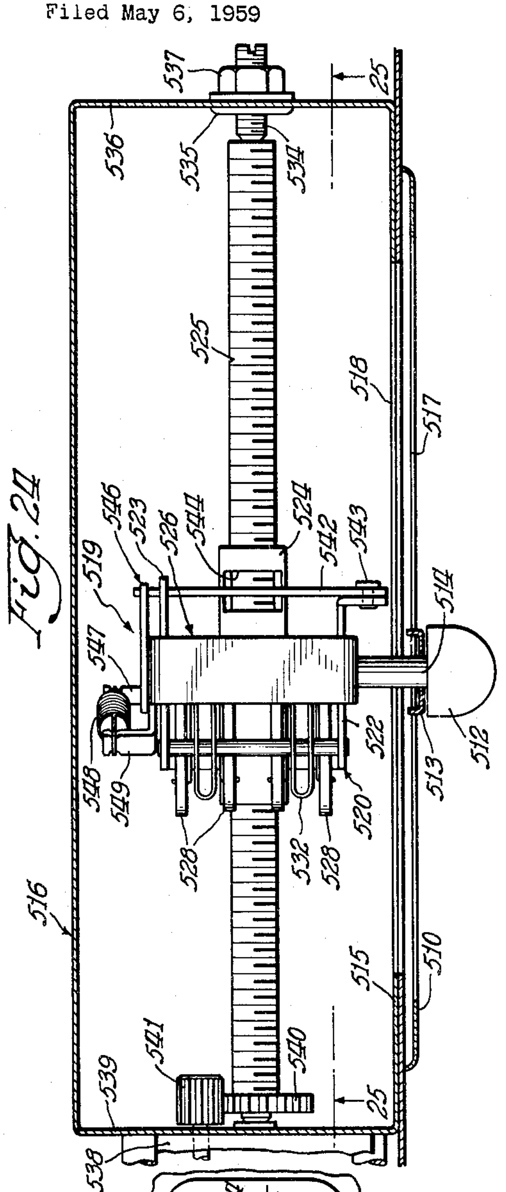
Figure 23:
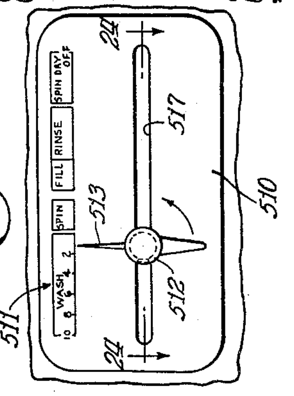
Figure 25:
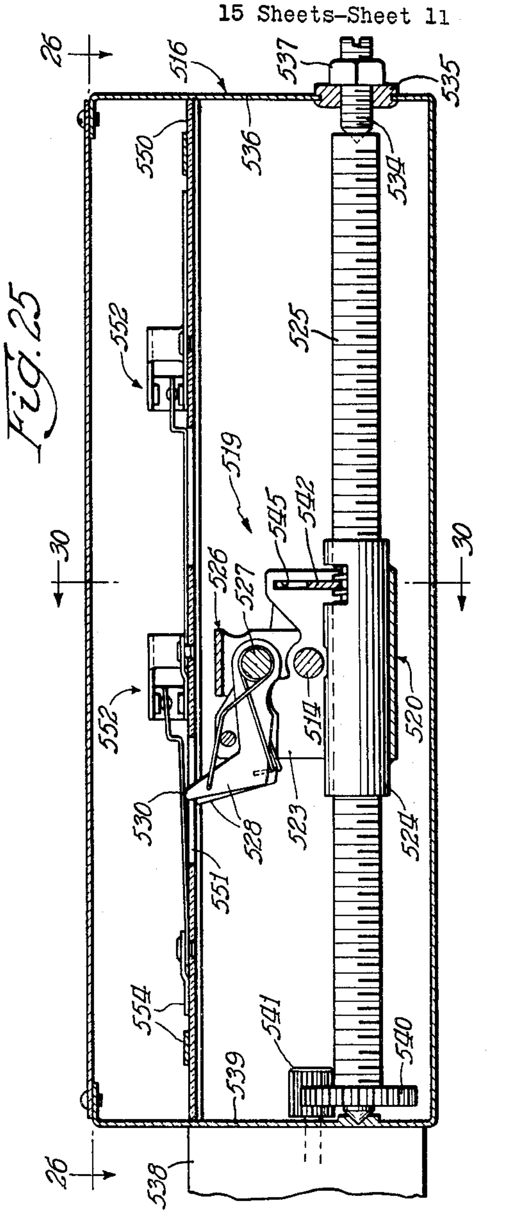
Figures 26, 27, 28, 29:
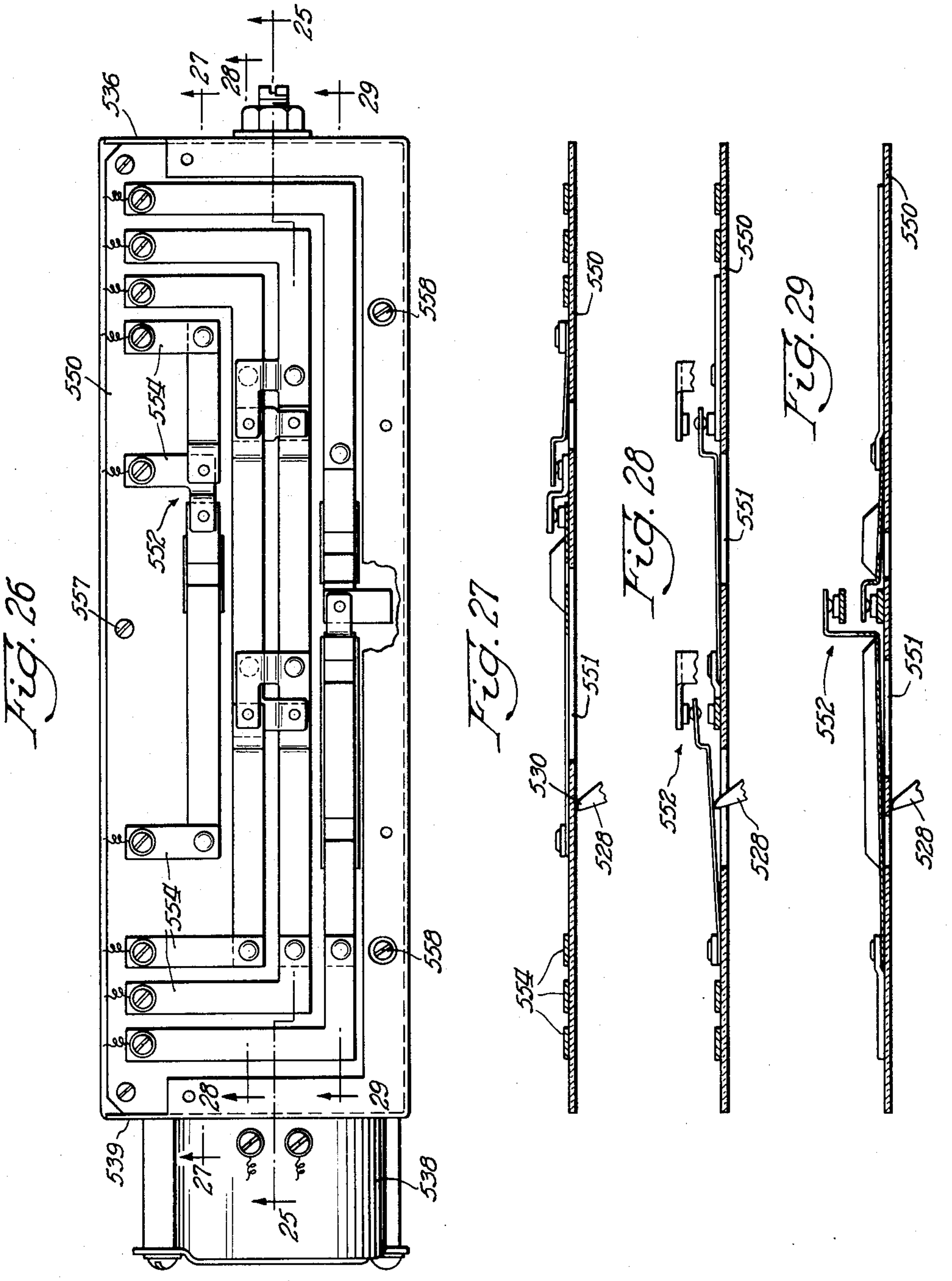
Figure 31:
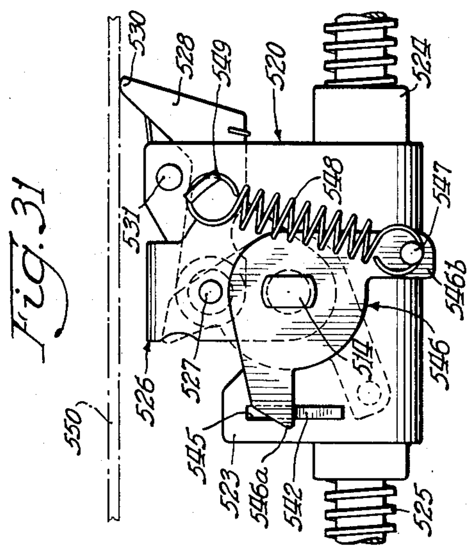
Figure 32:
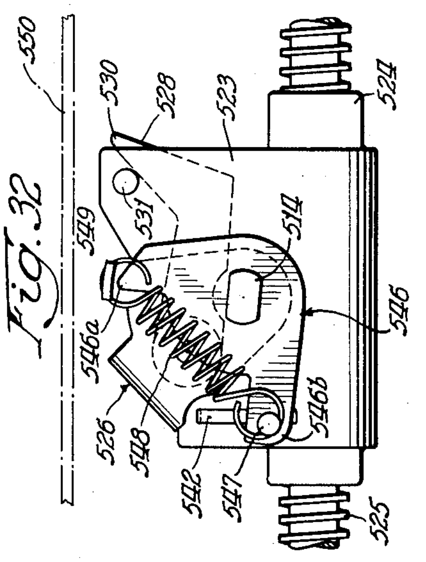
Figures 30, 33:
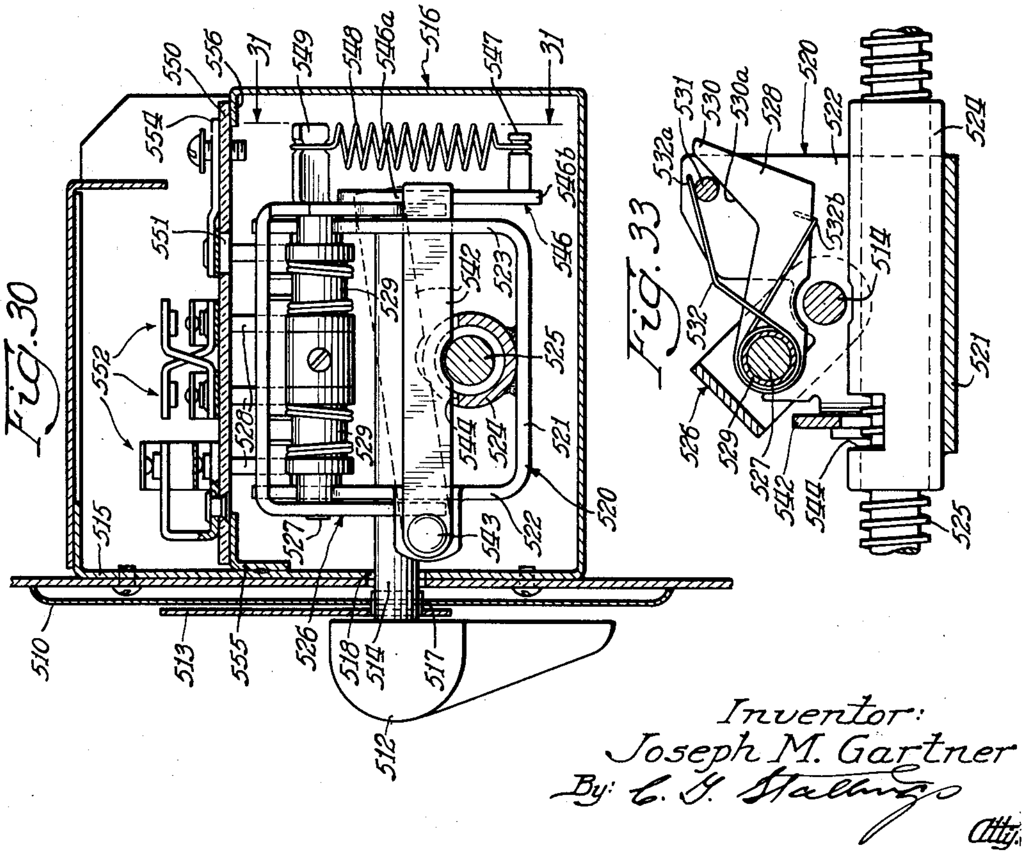
Figures 34, 35, 37:
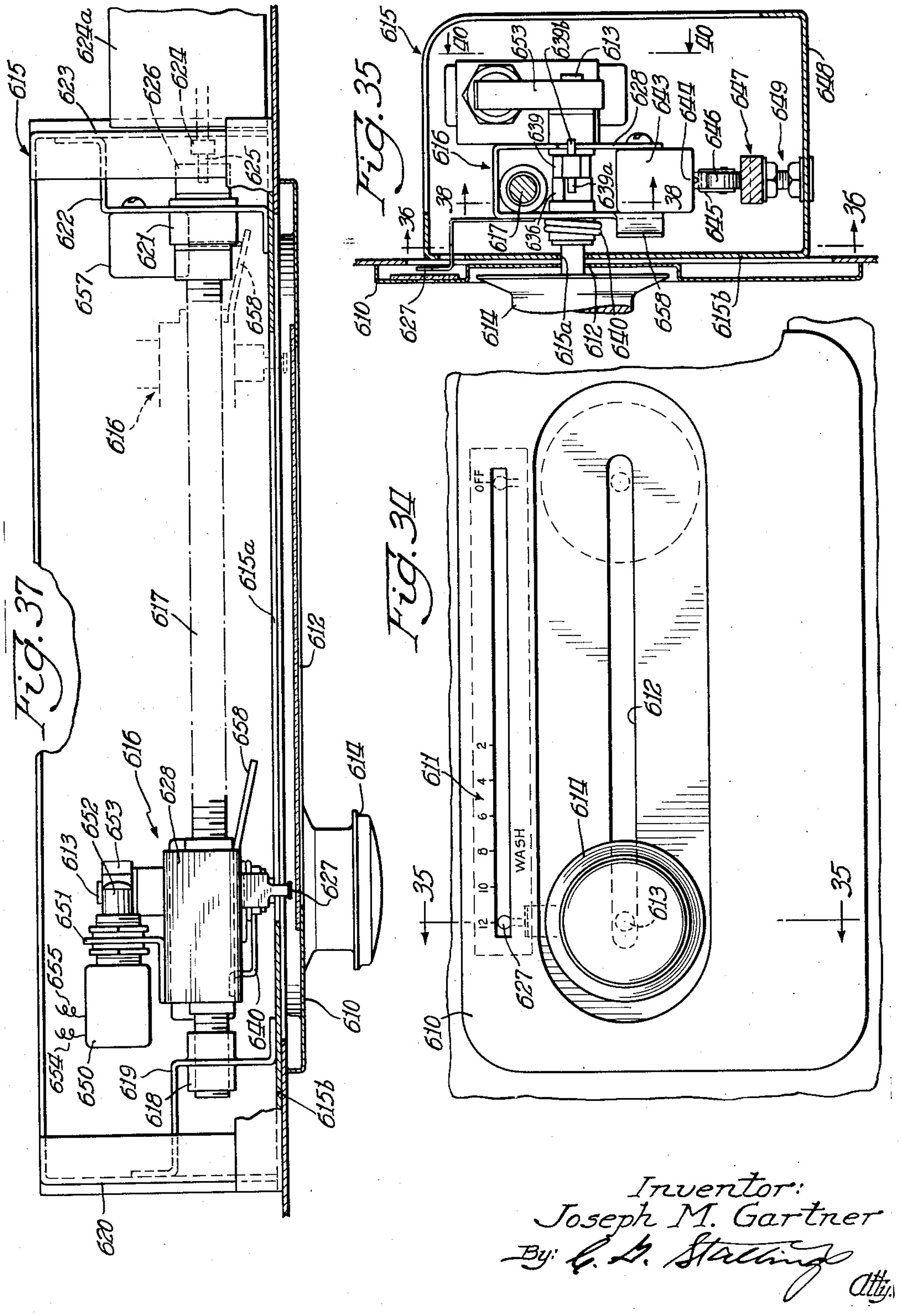
Figure 36:
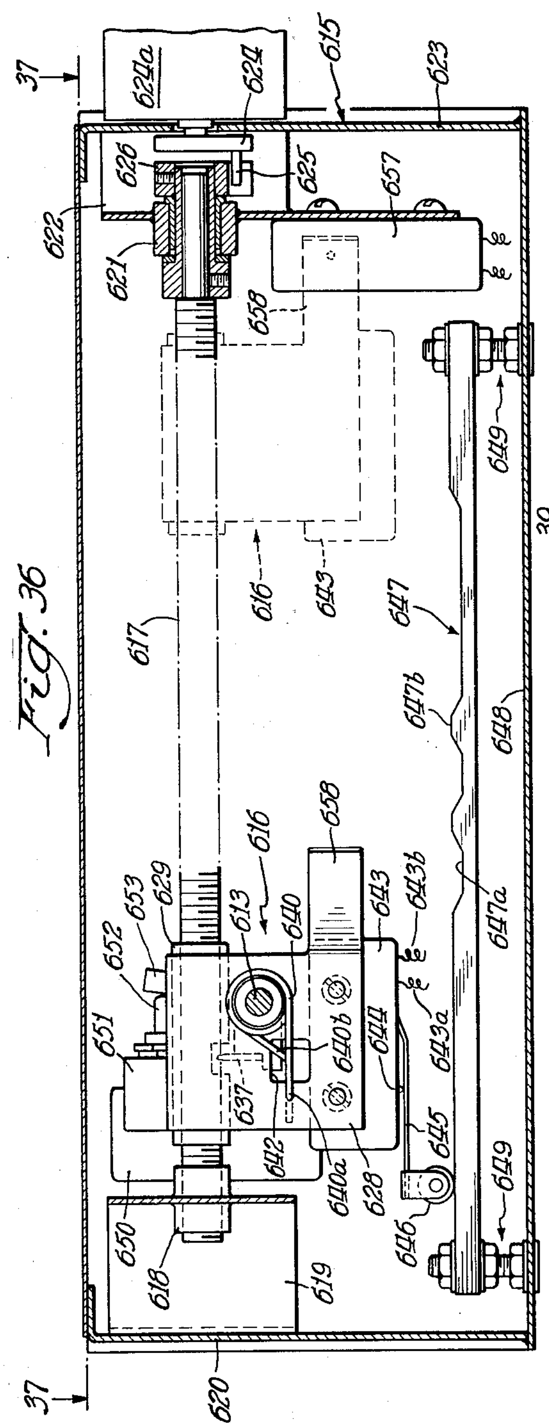
Figures 38, 39, 40:
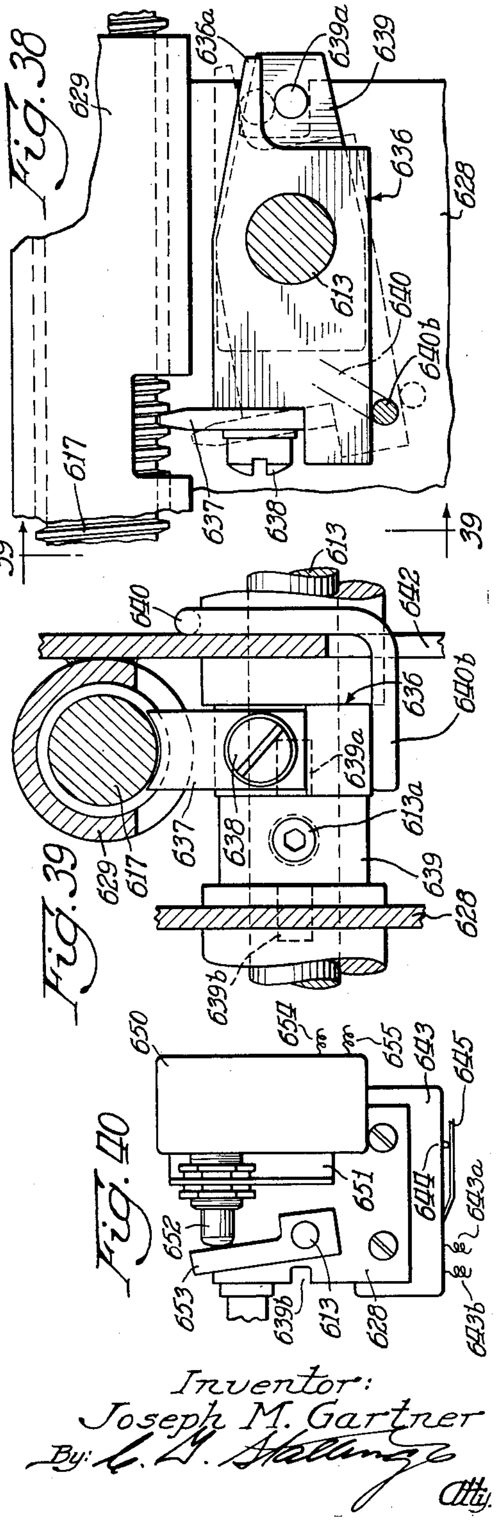

FIG. 23 is a front elevational view of another modification of a sequential controller;

FIG. 24 is a sectional view through the controller of FIG. 23 illustrating the linearly movable electrical contact operating carriage said section being taken on line 24—24 of FIG. 23;

FIG. 25 is a sectional view through the controller and illustrating the relative position of ports when the controller is operative, said section being taken on line 25—25 of FIG. 24;

FIG. 26 is an elevational view of the removable back plate of the sequential controller and illustrating the programming elements and its electrical contacts;

FIGS. 27, 28 and 29 are sectional views of various programming elements and positions of the contacts thereof upon actuation by the carriage in one position thereof, said section being taken on lines 27—27, 28—28, 29—29 of FIG. 26, respectively;

FIG. 30 is a sectional view of the controller taken on line 30—30 of FIG. 25; and illustrating the relative position of the parts when the controller is in its operative position;

FIG. 31 is a fragmentary sectional view of the electrical contact operating control latch mechanism for permitting relative movement of the carriage to selected position, the section being taken on line 31—31 of FIG. 30;

FIG. 32 is another view of the latch mechanism shown in FIG. 31, but illustrating the changed position of the parts to condition the carriage for movement in either direction in a lineal path when it is desired to move the control knob to different selected positions;

FIG. 33 is a sectional view of the latch mechanism shown in FIG. 32;

FIG. 34 is a partial front elevational view of another modification of a sequential controller;

FIG. 35 is a sectional view of the controller of FIG. 34 including the electrical contact carriage and taken substantially on line 35—35 of FIG. 34;

FIG. 36 is a longitudinal sectional view of the controller, taken substantially on line 36—36 of FIG. 35;

FIG. 37 is a top elevational view of a portion of the controller, and being taken substantially on line 37—37 of FIG. 36;

FIG. 38 is a fragmentary view of the latch mechanism of the control carriage for permitting relative movement of the carriage to selected positions and illustrating the latch mechanism in operative position, said section being taken on line 38—38 of FIG. 35;

FIG. 39 is a sectional view of the latch mechanism of FIG. 38 taken substantially on line 39—39 of FIG. 38; and FIG. 40 is an elevational view illustrating the off-on switch shown in FIGS. 35 and 37, and as viewed on line 40—40 of FIG. 35.

The drawings are to be understood to be more or less of a schematic character for the purpose of illustrating and disclosing a typical or preferred form of the improvements contemplated herein and in the drawings like reference characters identify the same parts in the several views.

Before explaining in detail the present invention, attention is invited to the premises that the invention is not limited in its application to an automatic washing machine as herein suggested since the invention obviously is capable of other embodiments and of being practiced or carried out in the various ways, and I do not wish to be limited in these suggested applications as set forth except where such construction or application particularly concerns the invention contemplated herein. Furthermore, the phraseology or terminology employed herein is for the purpose of description and not of limitation, and it is not intended to limit the invention and its application as claimed herein beyond the requirement of the prior art.

Figures 2, 10, 11:
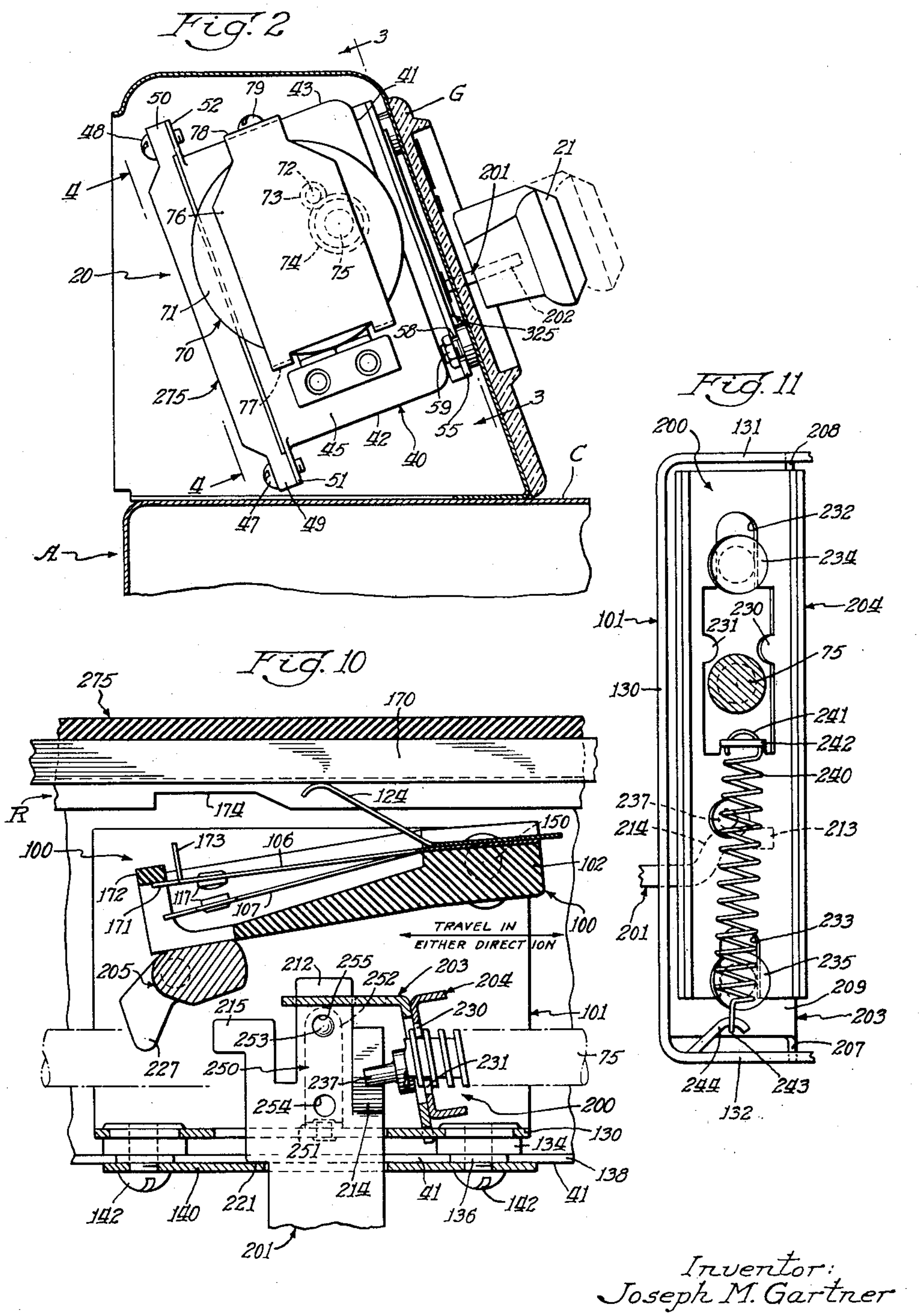
FIG. 2 is an end elevational view of the sequential controller contemplated by this invention and is shown in its operative position with respect to adjacent component parts of an automatic washing machine which are shown in section to more clearly show the relative disposition of the parts.
FIG. 10 is a sectional view through the electrical contact carriage but illustrating the changed position of the parts as shown in FIG. 8 to condition the electrical contact carriage for movement in either direction in a linear path when it is desired to move the control knob to different selected positions.
FIG. 11 is a side elevation of the electrical contact latch mechanism showing the changed relationship of parts as illustrated in FIG. 5 when the electrical contact mechanism is in its disengaged position as illustrated in FIG. 10.

Accordingly, as a suggested possible application of the sequential controller contemplated by this invention and generally indicated in its entirety by the numeral 20, and not by limitation, attention is directed to FIG. 1 wherein there is illustrated an automatic washing machine designated in its entirety by the letter A and comprising, generally, a cabinet B which houses the entire mechanism and control system therefor and which may include a cover C, a front panel D, side panels respectively indicated at E and F, and a control panel G forming a part of and projecting upwardly from the cover C as illustrated in FIGS. 1 and 2.

In this connection it is notable that an automatic washing machine such as is suggested herein and to which the contemplated sequential control may advantageously be employed is clearly shown and described in a copending patent application, S.N. 246,601, filed September 14, 1951, and entitled "Washing Machine"; therefore, the general construction thereof need only be herein described in sufficient detail to point out its general operating characteristics.

In FIG. 1 it can be seen that the washing machine A may have a cover C provided with a hinged lid H through which clothes or other articles to be cleansed may be introduced to the machine. The hinged lid H is so disposed with respect to the opening in the cover C that it will be flush with the surface of the cover when it is in its closed position.

On the left-hand side of the control panel G there is disposed a control switch 30 which provides a means for manually selectively regulating the operation of an automatic temperature control mixing valve (not shown) normally forming a part of the water inlet assembly (not shown). The mixing valve serves to provide for the introduction of cleaning fluids, in this case, water, at a proper temperature to insure proper cleansing of the articles to be laundered.

On the right-hand side of the control panel G there is disposed a control knob 21 forming a part of the sequential control 20 and which provides a means for manually operating said sequential control, this operation to be described more in detail hereinafter as the description proceeds. The length of the washing cycle may be predetermined and set within certain limits by the manual adjustment of the control knob 21 in a manner to be described in detail hereinafter.

It is notable that both the control switch 30 and the control knob 21 are shown as being disposed on the paneled surface G so that they provide no obstruction to the operator in the introduction of the articles to be laundered to the machine, or their removal therefrom.

Suffice it to say, since the invention is not particularly concerned with the precise construction of the automatic washing machine and/or its associated parts, they will not be further described in detail and where more detailed description of the automatic washing machine is desired, attention is directed to the aforementioned copending patent application, and it is deemed sufficient for all intentions and purposes herein contained to show a suggested automatic washing machine, portions of which may be adjacent to and cooperating with the sequential controller with which the invention is particularly concerned. It is to be understood that details of construction of such automatic washing machine or any other domestic appliance, machine or mechanism to which the sequential controller may advantageously be employed may be modified to suit particular conditions or to satisfy the engineering genius of various competitive manufacturers, and I do not wish to be limited to the construction of these elements as suggested except where such construction particularly concerns the invention contemplated herein.

Having thus described, by way of example, a suggested possible application of the sequential controller 20 and having described the general environment surrounding the adaptation, the specific construction and function of the parts of the said sequential controller will now be described in detail.

In the exemplary embodiment of the invention depicted in FIGS. 2 through 11, the sequential control 20 contemplated by this invention comprises, in general, the component part assemblies respectively indicated in their entirety by the numerals as follows: a housing 40 of a generally rectangular shape; a driving means 70 comprising a constant speed electric motor 71 carried by an end wall of said housing and having a drive shaft 72 (FIG. 4) projecting into said housing and upon which there is mounted a pinion gear 73 adapted for driving interengagement with a driven gear 74 mounted adjacent the end portions of a threaded shaft 75 carried for driven rotative movement by opposite ends of said housing; an electrical contact carrier 100 mounted in said housing for longitudinal linear movement within the housing in either direction; a latching means 200 carried by said electrical contact carrier and operable by said control knob 21 whereby said carrier may be caused to move in one linear direction responsive to engagement of said latch means with said rotative threaded shaft 75, and said carrier may be moved in either direction linearly responsive to disengagement of said latch means my manual movement of the control knob 21; a program regulating element 275 preferably formed of a plastic composition and defining a removable back wall of said housing, said program regulating element having electric conducting metal tracks engaged by portions of said electrical contact carrier, and means engaged by other portions of said electrical contacts to effect opening and closing of selected contacts in a predetermined sequence; and time adjustable means 325 carried by said housing adjacent one end thereof and adapted for engagement by portions of said control knob 21 whereby the time of one sequential operation may be varied.

*The housing 40*

Figure 3:
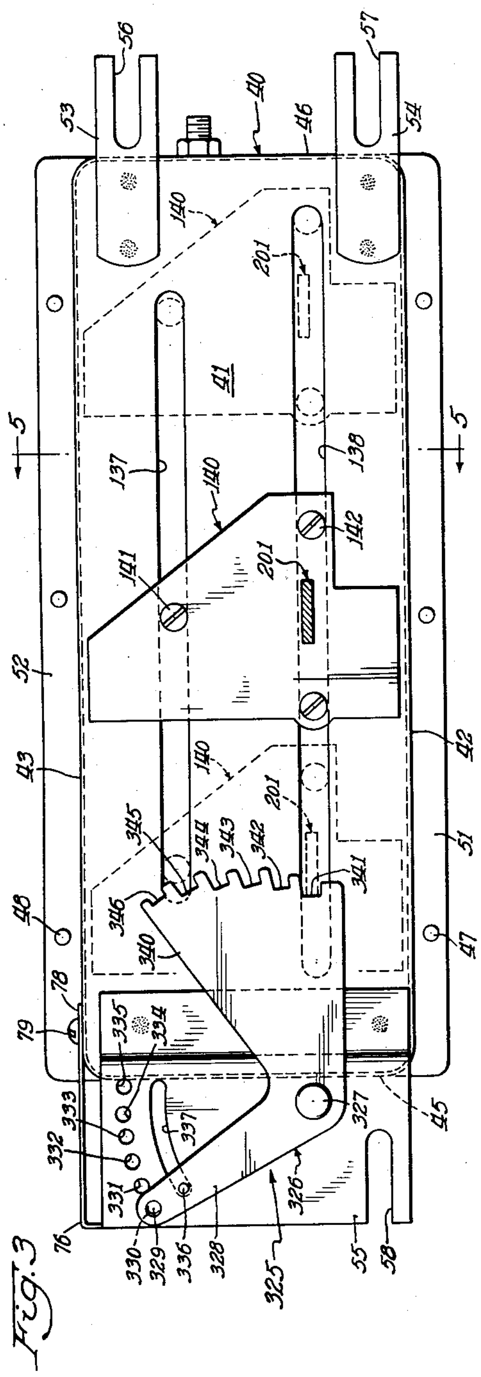
FIG. 3 is a front elevational view of the sequential controller contemplated by this invention and being taken substantially on the plane of the line 3—3 in FIG. 2.

Particular attention is invited to FIGS. 2 and 3 wherein there are illustrated the structural elements of the housing 40 which may comprise a front wall 41, side walls 42 and 43 and end walls 45 and 46. In FIG. 2 the housing 40 is shown disposed in its operative position with respect to the control panel G of an automatic washing machine. Moreover, it can be seen that the programming element 275 is arranged to provide the back wall of the housing 40 and is secured thereto by bolts such as at 47 and 48, the stud of which is adapted to be received into suitable apertures respectively disposed in flanged side portions 49 and 50, and the threaded end portions of the bolts being adapted to be received into threaded through apertures respectively disposed in flanges 51 and 52 forming a part of the housing 40. By removing the bolts as at 47 and 48 the programming elements 275 may be removed from the housing thus exposing the internal parts for accessibility thereto.

Fixedly secured to the front wall 41 of the housing 40 there is provided projecting brackets 53, 54 and 55 respectively provided with slots 56, 57 and 58, these slots being adapted to receive bolts and nuts generally indicated as at 59 suitably carried by adjacent portions of the machine to which the sequential controller is affixed. By removing the nuts and bolts as at 59 the sequential controller can be bodily removed from the machine for repair or replacement purposes. Of course, the control knob 21 must be removed from its normal position before removal of the sequential controller from the machine.

*Driving mechanism 70*

The driving mechanism 70 comprises a constant speed electric motor 71 carried by the end wall 45 of the housing 40 and has a drive shaft 72 projecting into said housing and upon which there is mounted a pinion gear 73 adapted for driving interengagement with a driven gear 74 mounted adjacent the end portions of a threaded shaft 75 carried for driven rotative movement by opposite ends 45 and 46 of said housing.

Figure 4:
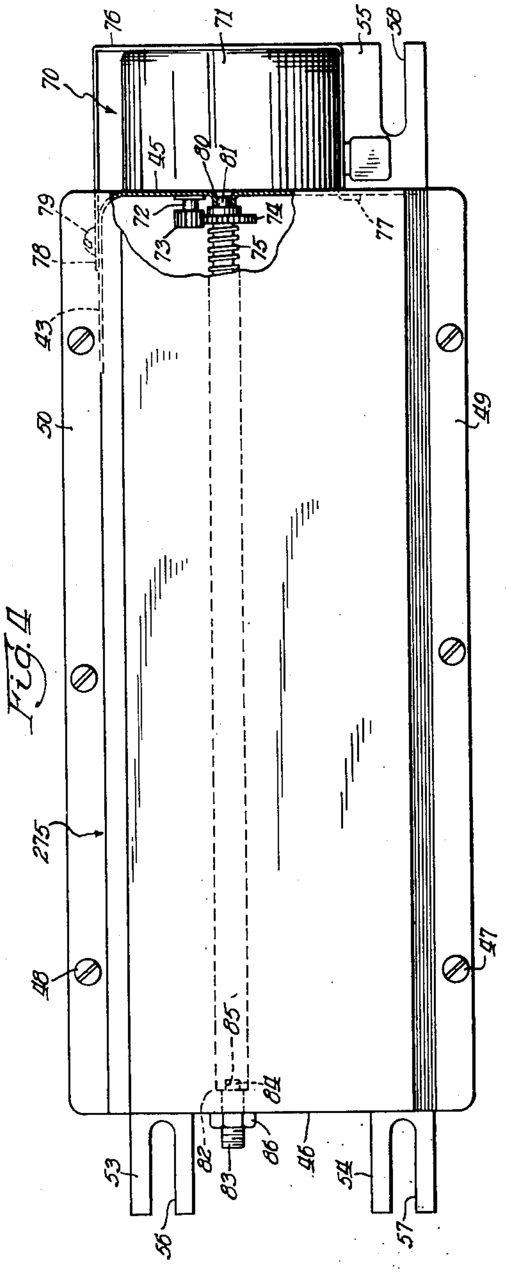
FIG. 4 is a back elevational view of the sequential controller depicted in FIG. 3 and being taken substantially on the line 4—4 in FIG. 2 and with portions thereof broken away to more clearly illustrate the internal construction of the sequential controller.
Figure 6:
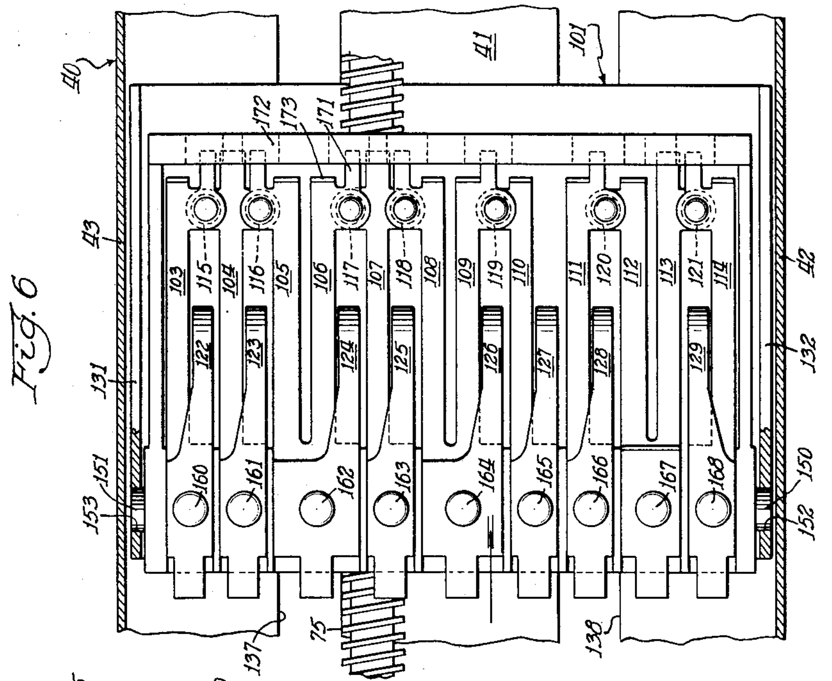
FIG. 6 is a top plan view of the linearly movably electrical contact carriage, this view being taken substantially on the plane of the line 6—6 in FIG. 5.

Attention is invited to FIG. 4 wherein the constant speed electric motor 71 is shown mounted on the end wall 45 of the housing 40 by means of a bent bracket 76, one end of which is provided with a bent lip 77 adapted to be received into a struck-out portion of the end wall 45 for engagement with the inner surface thereof in order to maintain the same in its proper position. The other end 78 of the bracket 76 is secured to the top wall 43 of the housing 40 by means of a screw 79 adapted to be received into a suitable threaded opening (not shown) disposed in this side wall of the housing. Thus, by removing the screw 79 the end portion 78 of the bracket 76 is free for relative movement and the bracket may be moved downwardly from the position as shown in FIG. 4 whereby the bent lip 77 may be drawn through its related aperture in the end wall 45 which would permit removal of the motor 71 from its attached position to the side wall 45.

As will be best seen in FIG. 4, the drive shaft 72 of the motor 71 projects inwardly into the housing 40 and has mounted thereon the pinion gear 73 which is adapted for driving interengagement with the driven gear 74. It is particularly notable that the gear ratio is effected by the pinion gear 73 and the pinion gear 74 and the gear ratio may be changed by relatively increasing and decreasing the respective sizes so as to accomplish the desired speed of the threaded shaft 75. Thus, it can be seen that by judicious selection of the pinion 73 and the driven gear 74 predetermined desirable speed ratios may be effected.

In order to properly mount the driven shaft 75 in the housing 40 so that there is a minimum of friction against rotation of this shaft, there is provided a bearing 80 formed of portions of the side wall 45 being struck inwardly of the housing to define a flanged aperture adapted to receive shaft portions 81 of the threaded shaft 75 for relative rotation therebetween. At the other end 82 of the threaded shaft 75 there is provided a threaded stud 83 projecting inwardly through the wall 46 of the housing 40 and having projecting end portions 84 of a smaller diameter and adapted to be received into a counterbore 85 disposed in the end portions 82 of the screw threaded shaft 75.

Relative axial adjustment of the stud 83 is accomplished by the provision of the nut 86 which, in effect, when tightened locks the stud 83 into the selected adjusted position. It is important that this stud should be so positioned as to provide slight play between the engaging surfaces thereof and that of the screw threaded shaft 75 so as to hold to a minimum any friction resulting from the contacting surfaces of these parts.

In order to remove the shaft 75 from the housing 40 it is only necessary to loosen the nut 86 and remove the stud 83 from its position whereupon the screw threaded shaft 75 would be free to be withdrawn from the housing for repair or replacement purposes. In assembly the projecting end portions 81 are first inserted into the bearing 80 and then the stud 83 is screwed into position as hereinbefore described and locked in this position by the tightening of the nut 86.

It is important to understand that it is preferable, and in accordance with the teachings of this invention, for the motor 71 to be of the constant speed type and to drive the screw threaded shaft 75 at an even rotative speed during all of the sequential operations of the controller contemplated by this invention. In the description of the electrical circuit following hereinafter a more detailed description of the phases of operation of this driving mechanism will be made.

*Electrical contact carrier 100*

An important feature of the invention is the electrical contact carrier generally indicated in its entirety by the numeral 100 and mounted on the front wall 41 of the housing 40 for longitudinal linear movement within the housing 40 in either direction.

As particularly shown in FIGS. 5, 6, 7, 8, 10, and 11, the electrical contact carrier 100 comprises, in general, a C-shaped support bracket 101 carried by the front wall 41 for relative linear sliding movement therebetween, an electrical contact support 102 formed of an insulated material such as, for example, a plastic composition, and carried for relative pivotal movement by the bracket 101, said contact support having suitably mounted thereon a plurality of electrical conducting arms designated by the numerals 103 through 114 (FIG. 6) each respectively provided at one end portions thereof with engageable matching electrical contact points designated by numerals 115 through 121, and said arms respectively having a plurality of trolley-like elements designated by numerals 122 through 129 and which are adapted to engage electrical conducting metal tracks forming a part of the programming elements to be hereinafter described further in detail.

Figure 5:
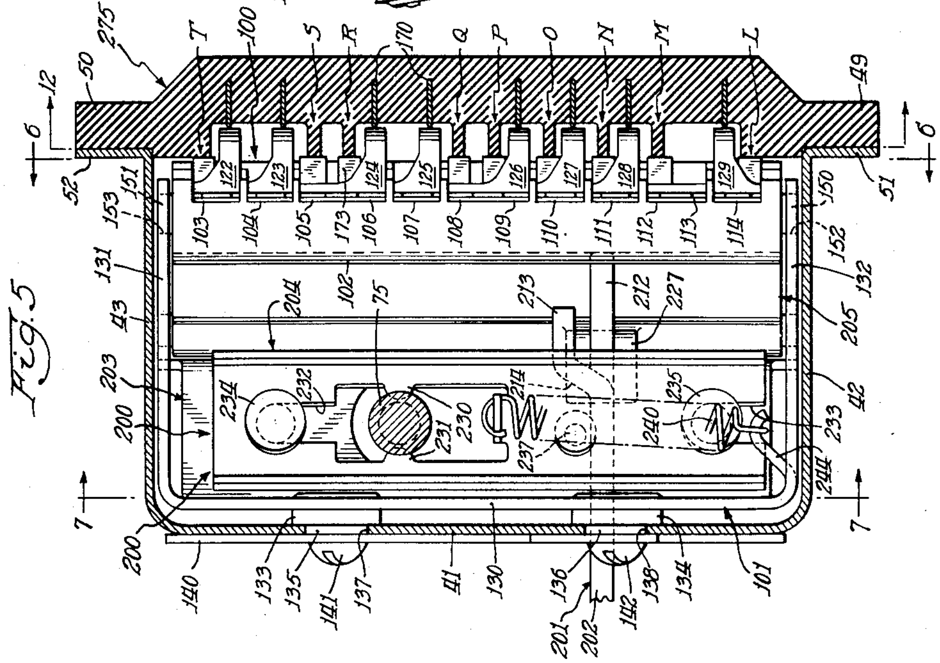
FIG. 5 is a sectional view of the sequential controller illustrating the relative disposition of the parts in the interior thereof, this section being taken substantially on the plane of the line 5—5 in FIG. 3.
Figure 8:
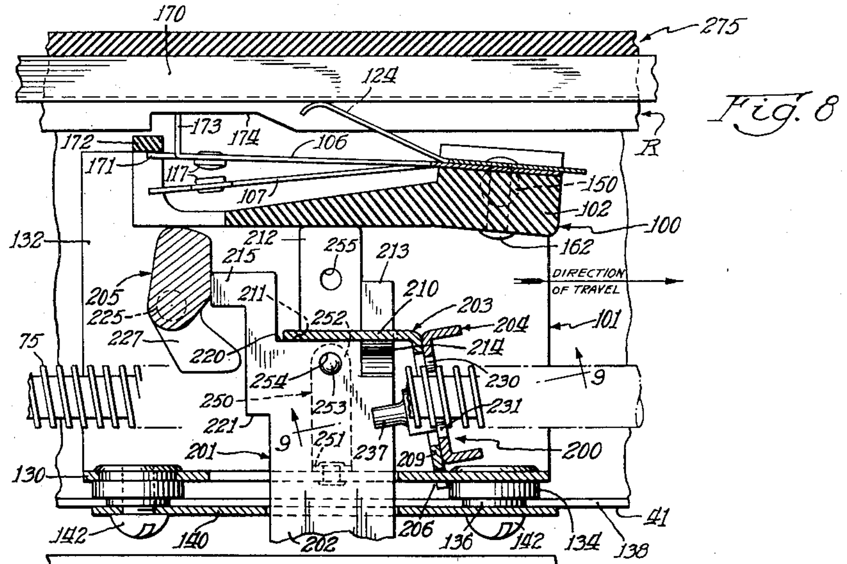
FIG. 8 is a sectional view through the electrical contact carriage depicted in FIGS. 5 and 6 and illustrating the relative disposition of the parts when the sequential controller is in its operative position, this view being taken substantially on the plane of the line 8—8 of FIG. 7.

As can best be seen in FIGS. 5, 8 and 10, the C-shaped bracket comprises a web 130 having integral projecting legs 131 and 132, said web 130 having secured thereto spacer elements 133 and 134 so that when the C-shaped bracket is disposed in its operative position as shown in FIG. 5 it will be maintained in spaced relation with respect to the inner surface of the wall 41 of the housing 40. The spacer elements 133 and 134 respectively may have formed therewith circular bearings 135, 136 adapted to be received into slotted apertures 137, 138 (FIGS. 3 and 5). Disposed outwardly of the housing 40 and adapted to contact the surface of the wall 41 to effectively stabilize the C-shaped bracket 101 there is provided the stabilizing plate generally indicated by the numeral 140 and arranged to be maintained in spaced relationship with respect to the spacer elements 133 and 134 by virtue of the bearing elements 135 and 136 and being held in such position by virtue of screws 141 and 142 which are also adapted to maintain these parts in their respective assembled relationship.

The electrical contact support 102 is preferably formed as shown of a plastic composition and is carried by the bracket 101 for relative pivotal movement between two positions one of which is the operative position as illustrated in FIG. 8 and the other of which is the inoperative position as illustrated in FIG. 10. It is notable that the contact support 102 is mounted on the C-shaped bracket by virtue of transversely projecting trunnions 150 and 151 respectively received into apertures 152, 153 respectively disposed in legs 132 and 131 of the C-shaped bracket 101.

The arms 103 through 114 and the trolley-like elements 122 through 129 are each secured at one end thereof to the insulated contact support 102 and maintained in their respective operative positions as shown by rivets designated by the numerals 160 through 168.

Since each of the arms 103 through 114 are of similar construction, it is deemed sufficient to describe only a set of these elements. Accordingly, attention is directed to FIGS. 8 and 10 which show the arms 106 and 107 as being provided with engageable matching electrical contact points 117 and provided with the trolley-like element 124 adapted to engage an electrical conducting metal track 170 forming a part of the programming element 275. In FIG. 8 it can be seen that the arm 106 is provided with an end portion 171 adapted to engage a stop 172 whereby relative upward movement of this arm is restricted.

Figure 14:
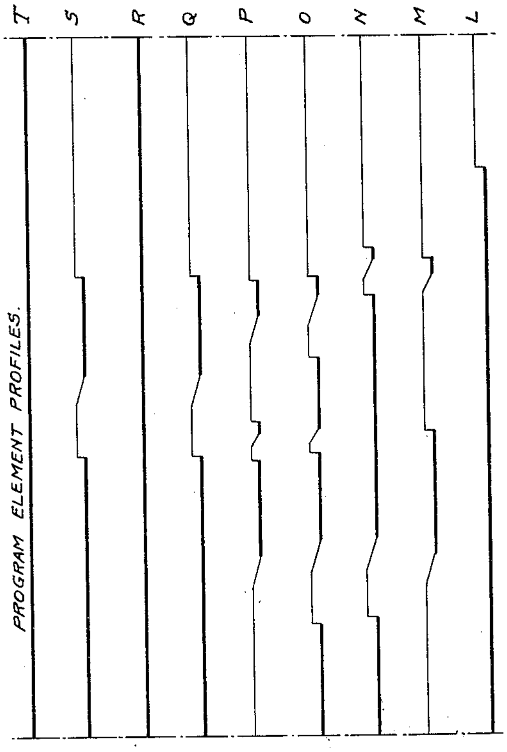
FIG. 14 is a diagrammatic view of the track profiles forming a part of the programming mechanism illustrated in FIG. 5.

It is important to note that the arm 106 is provided with an integral upstanding cam lug 173 adapted to engage a linearly arranged camming surface 174 forming a part of a programming element R. (See FIGS. 5, 8 and 14.) As can best be seen in FIG. 8 the camming surface 174 is provided with undulations selectively disposed whereby the cam lug 173 is caused to ride thereupon and follow the path defined by these undulations thereby to cause engagement and disengagement of the matching electrical contact points 117 in a predetermined and controlled sequence. In FIG. 8 the integral cam lug 173 is shown in one of the hereinbefore described undulations of the camming surface 174 and thus the contact points 117 are shown in their disengaged position. If the integral cam lug 173 were engaged with the downwardly projecting portions of the camming surface 174 just to the left of the position as shown the electrical contact points 117 would be in engagement.

*Latching assembly 200*

Having described the driving mechanism generally indicated by the numeral 70 and the electrical contact carrier 100, another important feature of the invention is the latchnig assembly 200 arranged to couple and uncouple the electrical contact carrier 100 with the screw threaded shaft 75 of the driving mechanism 70 so that when these elements are in their coupled relationship the contact carrier will be caused to move linearly in the direction of travel indicated by the arrow in FIG. 8 so that the electrical contact elements will be caused to open and close, as the case may be, responsive to their passage through the predetermined sequential operation.

The latching mechanism 200 may be moved to its uncoupled position from the programming elements 275 and, simultaneously therewith, cause disengagement of the electric contact carrier 100 from the screw threaded shaft 75 of the driving mechanism 70 whereupon the electrical contact carrier 100 may be moved manually in either direction without danger to breakage of electrical contacts.

It is notable that the relative disposition of the parts when the latching mechanism is in its engaged position is clearly shown in FIG. 8 while the relative disposition of the parts when the latching mechanism is in its disengaged position is clearly shown in FIG. 10.

In FIGS, 5, 7, 8, 9, 10 and 11, it can be seen that the latching mechanism generally indicated by the numeral 200 comprises a latch actuator bar 201 having end portions 202 thereof projecting outwardly of the housing 40 and upon which there is mounted the control knob 21 (FIG. 2), a support bracket generally indicated by the numeral 203, a spring returnable latch bolt generally indicated by the numeral 204 and carried by the said support bracket 203 for limited transverse movement with respect to the axis of said screw threaded shaft 75, and an elevator generally indicated by the numeral 205 operable responsive to manipulation of the actuator bar 201 and effective to cause movement of said insulated electrical contact carrier 102 between operative and inoperative positions hereinbefore described.

Figure 7:
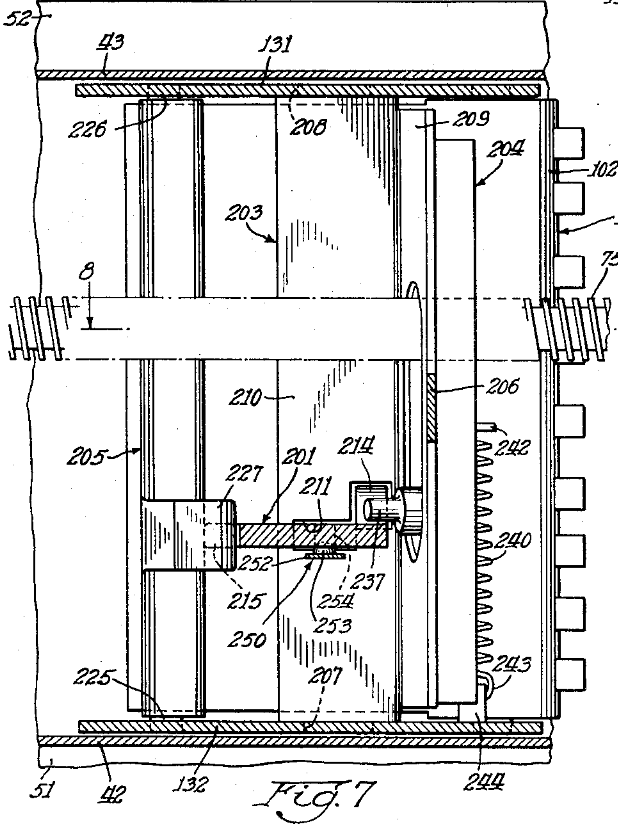
FIG. 7 is an elevational view of the bottom of the electrical contact carriage depicted in FIG. 6 and being taken substantially on the plane of the line 7—7 in FIG. 5.
Figure 9:
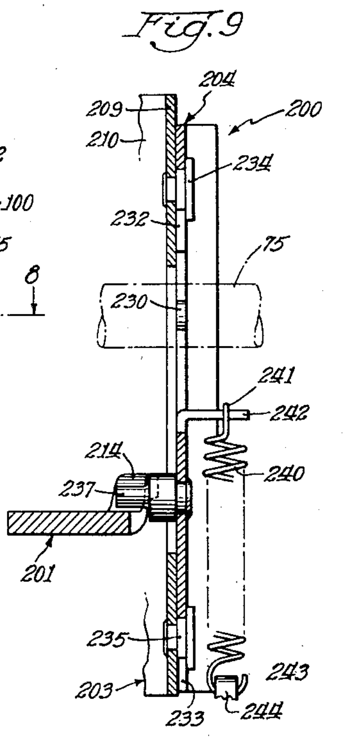
FIG. 9 is a fragmentary sectional view of the electrical contact latch mechanism for permitting relative movement of the electrical contact carriage to selected positions, this view being taken substantially on the plane of the line 9—9 in FIG. 8.

As may best be seen in FIG. 8 the support bracket 203 is secured as at 206 to the web 130 of the C-shaped support bracket 101 and is secured as at 207 and 208 to the legs 132 and 131 as shown in FIG. 7. It is particularly notable that the leg 209 (FIG. 8) is slightly angularly disposed so as to conform substantially to the angle defined by the screw threads of the screw threaded shaft 75 while the leg 210 is substantially horizontally disposed as shown in this FIG. 8 and is provided with a through aperture 211 adapted to receive a projecting leg 212 forming an integral part of the actuator bar 201, said through aperture 211 also being adapted to receive the integral leg 213 of the actuator 201, which leg 213 is provided with a camming surface 214 whose function will be hereinafter described in detail.

In FIG. 8 it can be seen that the actuator bar 201 is provided with a substantially Z-shaped integral bar 215 portions of which are shown in engagement with the elevator 205 when the elevator is in its position to cause said insulated electrical carrier 102 to be in its operative position.

It is notable that the actuator bar 201 is movable inwardly and outwardly of the housing 40 between two positions. In FIG. 8 the actuator bar 201 is shown in its inward position while in FIG. 10 the actuator bar 201 is shown in its outward position. In FIG. 8 it can be seen that when the actuator bar 201 is in its innermost position portions thereof as at 220 are in engagement with the underside of the leg 210 of the support bracket 203 thereby preventing further inward movement of the actuator bar 201. In FIG. 10 the actuator bar 201 is shown in its outermost position and further outward movement is prevented by engagement of the flange 221 with the inner surface of the stabilizer plate 140.

In FIGS. 7, 8 and 10 it can be seen that the elevator 205 comprises a bar pivotally mounted between the legs 131 and 132 of the C-shaped bracket 101 by means of the trunnions respectively indicated at 225 and 226 (FIG. 7), and said bar being provided with an integral downwardly projecting leg 227 with which portions of the Z-shaped bar 215 will become engaged when the actuator bar 201 is pulled outwardly of the housing 40 by virtue of manual manipulation of the control knob 21 to the position shown in dotted lines in FIG. 2, whereupon said elevator bar 205 will be caused to pivot upon the trunnions 225 and 226 to the position as shown in FIG. 10 which will cause the adjacent end portions of the insulated electrical contact carrier 102 to drop downwardly responsive to gravity assisted by the spring-like reaction of the trolley-like elements 123 which generally urge or provide force urging said insulated electrical contact carrier 102 to its position as shown in FIG. 10.

When the actuator bar 201 is moved inwardly of the housing 40 by manual manipulation of the control knob 21 to the full line position as shown in FIG. 2, portions of the Z-shaped bar 215 will become engaged with the elevator bar 205 to cause pivotal movement of the same back to the position shown in FIG. 8. This movement of the elevator bar 205 will overcome the thrust or force of the spring-like trolley elements 123 and urge the elevation of the adjacent portions of the insulated electrical contact carrier 102 to its operative position whereupon the lug 173 will become engaged with the camming surface 174 of a programming element and thus dispose the parts of the electrical contact carrier in their operative position. Simultaneously with the aforementioned action of the elevator bar 205, the action of the spring returnable latch bolt is effective to couple the electrical contact carrier assembly to the screw threaded shaft 75 which, as was hereinbefore described, is continuously rotating at a uniform rate of speed, this coupling of these elements causing movement of the entire electrical contact carrier assembly in the direction of travel indicated by the arrow in FIG. 8, whereby the various electrical contact elements will be opened and closed responsive to engagement with particularly defined programming elements effecting opening and closing of said electrical contacts in a predetermined sequence and pattern.

As can be best seen in FIGS. 5, 7 and 8, the spring returnable latch bolt 204 comprises a substantially C-shaped bar movable transversely of the axis of said screw threaded shaft 75. In FIG. 5 it can be seen that the latch bolt 204 is provided with teeth respectively indicated at 230 and 231 each being engageable with the screw threaded shaft 75 when the actuator bar 201 is in its inward position. Transverse movement of the latch bolt 204 is facilitated by virtue of the slots 232 and 233, respectively, adapted to receive portions of rivets 234 and 235. Carried by said latch bolt 204 is a trunnion bar 237 adapted to engage the cam surface 214 of the integral leg 213 of the actuator bar 201. Of course, the engagement of the trunnion 237 with the cam surface 214 is effected when the actuator bar 201 is pulled outwardly of the housing 40 by manual manipulation of the control knob 21 to the dotted line position as shown in FIG. 2. Upon engagement of the trunnion 237 with the camming surface 214 the latch bolt 204 is forced to move transversely of the axis of the screw threaded shaft 75 to the position shown in FIG. 11, which will cause disengagement of the teeth 230 and 231 from the screw threaded shaft 75. This action will cause disengagement of the electrical contact carrier from the driving mechanism whereupon the entire electrical contact carrier assembly may be moved in either direction responsive to manual manipulation of the control knob 21.

When the control knob 21 is pushed inwardly to its full line position as shown in FIG. 2, the trunnion 237 will become disengaged from the cam surface 214 and, responsive to the force of the spring 240, one end portion 241 of which is secured to an integral lug 242 of the latch bolt 204 and the other end portion 243 of which is secured to an integral struck-out portion 244 of the wall 42 of the housing 40, the latch bolt 204 will be caused to move back to its normal position as indicated in FIG. 5, whereby the teeth 230 and 231 will become engaged with the screw threaded shaft 75 and, responsive to the rotation of said shaft 75, the entire electrical contact carrier assembly will be caused to move in the direction indicated by the arrow in FIG. 8 to perform the predetermined sequential operations contemplated by the sequential controller.

In order to maintain the actuator bar 201 in its inward or outward position there is provided an L-shaped spring-like bar 250, one leg 251 of which is suitably secured to the web 130 of the C-shaped bracket and the other leg 252 of which is provided with a depressed detent 253 adapted to become recessed into a through aperture 254 disposed in the actuator bar 201. This condition can best be seen in FIG. 8 which shows the bar in its inward position. In FIG. 10 it can be seen that the detent 253 will become recessed in a through aperture 255, whereby the actuator bar will be maintained in its outward position.

Although prior art sequential controllers of the rotary type were successful in their operation, great expense was entailed in revamping the prior art sequential controller in the event that a change in any one or more of the stations would be required. Even a slight change required a substantial rebuilding of the prior art conventional rotary type sequential controller.

In this connection it is notable that the sequential controller contemplated by this invention has been designed to overcome the aforementioned limitations in that only relatively few inexpensive parts need be interchanged to effect a change in the cyclic program. From a manufacturing standpoint this versatility provides distinct advantages in that a substantial part of the instant sequential controller is considered standard, that is to say, the hereinbefore described housing 40, the driving means 70, the electrical contact carrier 100, and the latching means 200 may be assembled and remain unchanged regardless of the cyclic program desired. Only the relatively inexpensive programming element 275 to be hereinafter described need be changed to adapt the basic sequential controller for operation on different types of machinery or other equipment, each of which may call for a different sequence of operation in the cyclic program. From an assembly standpoint, the aforementioned advantages are obvious and substantial costs in the manufacture of sequential controllers according to the teachings of this invention would be effected.

Having thus described the component parts which are considered the basic elements of the sequential controller contemplated by this invention, one possible form of a programming element 275 will now be described in detail.

*Programming element 275*

An important feature of the present invention is the especially designed programming element generally indicated by the numeral 275 and best illustrated in the drawings in FIGS. 5, 8, 12 and 13 and which is unique in its construction and arrangement in that the various elements thereof may be rearranged whereby the cyclic program may be changed without requiring fundamental structural modification of the hereinbefore described basic component elements of the sequential controller.

Figure 12:
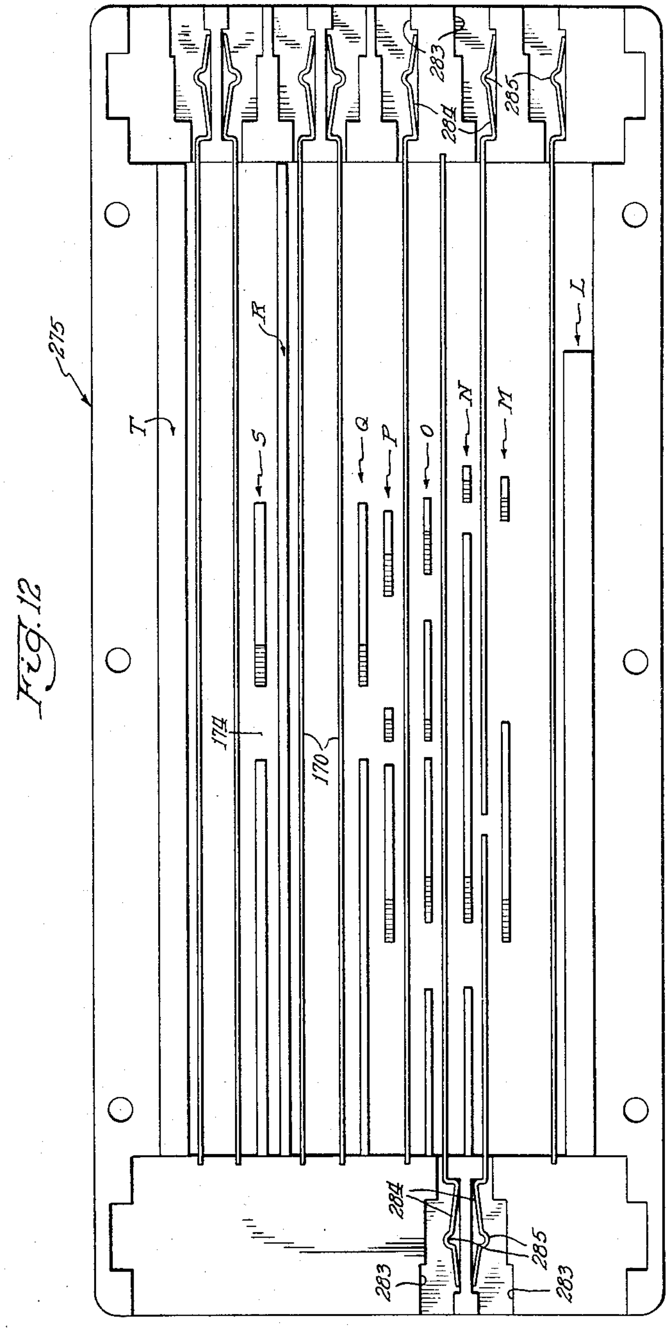
FIG. 12 is an elevational view of the inside face of the back of the sequential controller, whereupon there is disposed the programming elements and electrical connections, this view being taken substantially on the plane of the line 12—12 in FIG. 5.

In FIG. 12 it can be seen that the programming elements 275 are formed of a plastic composition to define a substantially rectangular shape and arranged for adaptability as a wall of the housing 40 when disposed in its operative position and attached to the housing 40 by means of suitable screws as at 47 and 48. On the inside surface of the programming element 275 there are formed projections defining undulated surfaces adapted for engagement by the integral cam lugs as at 173 of the arms 103 through 114, the engagement of these elements when passing over and through the undulated surfaces being effective to cause opening and closing of the matching electrical contacts 117 thereby to provide opening and closing of various predetermined electrical circuits to cause operation or inoperation of mechanisms (not shown) interconnected by these circuits in a predetermined cyclic program.

As may be best seen in FIG. 12 the cam surface 174 forming a part of the undulated surface S is clearly shown adjacent the track 170 with which trolley-like arm 123 is normally in engagement. For purposes of illustration, there is shown on FIGS. 12 and 14 various undulated surfaces indicated by the letters M, N, O, P, Q, R, S and T, each being arranged to define a different pattern whereby the opening and closing of electrical contacts as at 116 of associated arms 106 and 107 will be controlled by a respective undulated surface whereby control of machinery elements in circuit therewith will be effected in a predetermined cyclic program. It is obvious that the impressions defining the undulated surfaces may be varied as desired thereby to change the cyclic pattern.

It is notable that the illustrated arrangement of the undulated surfaces M, N, O, P, Q, R, S and T is one possible arrangement and one which may be adaptable for application in a sequential controller adapted to regulate the cyclic program of the hereinbefore suggested automatic washing machine.

Figure 13:
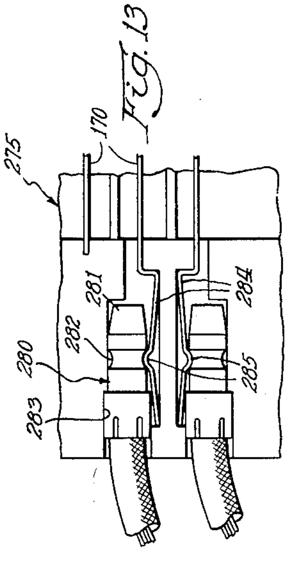
FIG. 13 is a fragmentary elevational view of a type of electrical connection suggested for advantageous employment with the sequential controller contemplated herein.

Attention is invited to FIGS. 12 and 13 wherein there is illustrated a preferred form of electrical connector forming a part of electrical circuit wires for the purpose of conveying electrical current to said sequential controller and from said sequential controller to various mechanisms (not shown) in the electrical circuit and desired to be controlled by said sequential controller.

In FIG. 13 it can be seen that the electrical connector comprises a male connector element 280 formed to define a stud-like shape and having a tapered head 281 and an annular groove 282 defining a neck adjacent said head, said male connector element being adapted for removable receipt into a female connector element 283 defined by an annular wall formed in said programming element 275. In order to provide a good electrical connection between the male and female connector elements, the end portion 284 of the tracks as at 170 is disposed within the confines of said female connector element 283 and has spring-like bent portions defining an arcuate section 285 adapted for intimate engagement with the annular groove 282 of the male connector element 280.

Thus, it can be seen that the electrical wires forming the electrical circuit (see FIG. 17) have at their end portions electrical connector elements hereinbefore described and the male connector elements may be conveniently inserted into the female connector elements and also conveniently removed therefrom in the event that it is desired to remove the sequential controller from the machine controller by the sequential controller. Moreover, for convenient assembly purposes the wiring system (see FIG. 17) may be installed in the machine and proper connections with the sequential controller may be effected merely by insertion of appropriate male connector elements into related female connector elements disposed in the sequential controller.

It is important to note that because the programming element 275 is formed of a plastic composition it is relatively inexpensive to manufacture and the molds employed in the manufacture thereof may be arranged so that the undulated surfaces may be changed conveniently to conform with a desired sequential pattern of operation. Since the only part of the sequential controller requiring a change is the programming element 275 to effect a change in cyclic program or in adapting the present sequential controller to different machines requiring control in a predetermined sequence or pattern, the savings in the cost of manufacture of a sequential controller as contemplated by this invention would be substantially reduced. From a manufacturing standpoint this versatility provides distinct advantages in that a substantial part of the instant sequential controller could be considered standard, that is to say, the hereinbefore decribed housing 40, the driving means 70, the electrical contact carrier 100, and the latching means 200 may be assembled and remain unchanged regardless of the cyclic program desired. Only the relatively inexpensive programming element 275 hereinbefore described need be changed to adapt the basic sequential controller for operation on different types of machinery or other equipment each of which may call for a different sequence of operation in the cyclic program. From an assembly standpoint, the aforementioned advantages are obvious and substantial costs in the manufacturing of sequential controllers according to the teachings of this invention would be effected. Moreover, an individual user of the sequential controller may wish to employ the same in several types of machinery each requiring a different cyclic program of operation. In such an event the basic sequential controller would be the same for each different machine but the programming element 275 would be changed to effect the desired cyclic program of operation.

*Time adjustable means 325*

Particular attention is directed to FIG. 3 wherein there is disclosed the time adjustable means 325 as being carried by the bracket 55 disposed adjacent one end of the housing 40 and said time adjustable means 325 being adapted for engagement by portions of the latch actuator bar 201 whereby the time of one or more sequential operations may be varied.

As was hereinbefore described, the latch actuator bar 201, when manually moved to its outward position, will permit manual movement of the electrical contact carrier 100 in a linear path in either direction. The extreme positions of movement of the actuator bar 201 are illustrated in dotted lines in FIG. 3. When a cyclic program is started the actuator bar 201 is manually moved to the extreme left position and is pushed inwardly whereby the latching mechanism will connect the electrical carrier 100 to the screw threaded shaft to drive or cause the electrical carrier 100 to move in a linear path to the right, as shown in FIG. 3, through the predetermined cyclic program and, upon completion of same, the latch actuator bar 201 will be in the dotted line position shown at the right-hand side of FIG. 3. Of course, suitable profiles on the programming element are provided to shut off all electrical current when the actuator bar 201 finally arrives at the end of its linear movement.

In FIG. 3 it can be seen that the time adjustable means 325 comprises a stop member indicated in its entirety by the numeral 326 pivotally mounted on the bracket 55 by means of a pivot pin 327, said stop member being formed to define an upstanding leg 328 having a detent depression 329 disposed adjacent the extreme end portions thereof, said detent being arranged for positioning in a through aperture 330 to provide frictional resistance to the pivotal movement of the stop member. Additional through apertures 331, 332, 333, 334, and 335 are provided in the bracket 55 in order to accommodate the detent 329 when the stop member 326 is moved to different positions. Pivotal movement of the stop member is restricted by the employment of a pin 336 disposed in the leg 328 and being adapted to be received into a slot 337 disposed in the bracket 55.

The stop member is also formed to define an arm 340, the outer edge of which is formed to define recesses 341, 342, 343, 344, 345 and 346 each arranged to fall on different planes responsive to pivotal movement of the stop member 326.

It can be seen that pivotal movement of the stop member 326 will cause the detent 329 to position itself in one of the through apertures indicated by the numerals 330 through 335. Simultaneously, with this action a corresponding recess indicated by the numerals 341 through 346 will be presented adjacent the latch actuator bar 201 for contact therewith as shown in the dotted line position at the right-hand side of FIG. 3. Movement of the arm 340 in a downwardly direction will successively present the different recesses indicated by the numerals 341 through 346 for engagement with the latch actuator bar 201. The respective disposition of the elements as shown in FIG. 3 will permit movement of the latch actuator bar 201 to its extreme left-hand position but as the stop member 326 is pivoted downwardly each successive recess as presented adjacent the latch actuator bar 201 will reduce lineal linear movement to the left of the latch actuator bar 201.

Attention is now directed to FIG. 18 which discloses the front panel of the sequential controller and shows the position of the indicator knob 21. In some applications of the sequential controller contemplated herein, for example, as in the suggested automatic washing machine disclosed in FIG. 1, it may be desirable to have an adjustable time for facilitating the filling of the washer tub. In some localities it may be desirable to have more water in the tub and in some other locations it may be desirable to have less water in the tub. The manual pivotal movement of the stop member 326 will permit adjustment of the time fill cycle so that various levels of the water in the tub may be effected. For example, the dotted line position of the control knob 21 in FIG. 18 indicates a six minute fill cycle and the recess 341 which, incidentally, allows the farthest lineal movement of the latch actuator bar 201 to the left, is in contact with the latch actuator bar 201. If a five minute fill cycle is desired, the stop member 326 is pivoted so that the recess 342 is presented for engagement with the latch actuator bar 201. This will reduce left-hand movement of the control knob 21 to the five minute line indicated in FIG. 18. In normal operation it has been found that a four minute fill cycle is the most desirable, and to accomplish this purpose, the stop member 326 would be pivoted so that the recess 343 is presented for engagement with the latch actuator bar 201 thereby to restrict left-hand movement of this bar, and there the indicator control knob 21 will be positioned at the four minute fill mark shown in FIG. 18. Of course, when the stop member 326 is pivoted to present the recess 343 for engagement with the latch actuator bar 201, the detent 329 will be positioned in the through aperture 332 thereby to maintain the stop member 326 in this position until manually moved to a new position.

Although the stop means herein illustrated is a suggested form for an automatic washing machine, it is obvious that the recesses could be extended or designed as desired to vary the sequence for more than one minute increments as suggested herein. In other applications it may be desirable to cut out certain portions of the sequence of operation and this may be accomplished by redesigning the stop member 326 so that one-half or one-third or one-fourth of the program may be eliminated as desired.

FIGS. 19–22, inclusive, illustrate a sequential controller embodying a modification of the invention. As shown in FIG. 19, the sequential controller comprises an indicating panel 410 provided with indicia 411 identifying various operational sequences or cycles of the washing machine, such as Wash, Spin, Rinse, etc. and which may be similar to the designation of the cycle previously discussed with reference to the sequential controller shown and described in FIGS. 1–18, inclusive.

The particular operational cycles of the washing machine is indicated by a pointer 412 carried by a control knob 413, the knob having for its purpose setting the controller mechanism for the selection of a sequence of operations of the washing machine desired by the housewife. In normal operation, the controller causes the knob to be moved in a linear path across the indicating panel 410 to indicate the cycle of the washing machine effective at a particular time. The knob can be pulled outwardly of the panel to disable the controller to allow the housewife to change the sequence of operations by movement of the knob in either direction along the linear path and then to move the knob inwardly to initiate operation of the cycle or cycles selected. More particularly and referring to FIGS. 20 and 21, the knob 413 is connected to one end of a shaft 414 extending through a tube 415 fixed at its other end by a bracket 416 to a carriage 417. The shaft 414 has a half nut 418 fixed to its end with the threaded portion of the half nut being engaged with a screw-threaded drive shaft 419. It will be apparent that, by movement of the knob 413 in an outward direction, the shaft 414 will also be moved outwardly to cause disengagement of the half nut with the shaft 419. The half nut and the screw-threaded shaft provide a driving connection for causing movement of the carriage 417 in a linear path longitudinally of the timer. More particularly and referring to FIG. 20, the shaft 419 has one end received within a bearing 420 fixed to the right side wall 421 of a housing generally indicated at 422 and the opposite end of the shaft is secured to the drive shaft of a motor 423 fixed to the left side wall 421 of the housing. The carriage is supported for movement longitudinally of the shaft 414 by rods 424 and 425 having ends extending through the right side wall 421 of the housing 422 and secured thereto by nuts threaded on the ends of the rods, the opposite ends of the rods being received within tubular end portions 426 of a support member attached to the left wall 420 of the housing 422. The carriage as seen in FIGS. 20 and 21 is in the form of a rectangular block having bottom grooves 427 and 428 for receiving the rods 424 and 425 and upon which the carriage is guidingly supported during movement of the carriage along the shaft 419.

To insure the half nut 418 will remain in constant engagement with the shaft 419 in the position of the parts shown in FIG. 3 and also to insure that, upon movement of the knob 413 outwardly, the half nut 418 will remain disengaged from the shaft 419 against inadvertent or accidental operation by the housewife during manual movement of the carriage, there is provided mechanism requiring a positive force to be exerted by the housewife both to release and to reengage the half nut 418 with the shaft 419 affording a safety factor preventing inadvertent reengagement of the same while the carriage is being manually adjusted along the linear path of travel and making it unnecessary for the operator to maintain a constant release pressure on the knob 413 once the knob has been released for such adjustment. This mechanism comprises a diamond-shaped member 429 pivotally mounted centrally thereof on the side wall of the carriage 417 with one of the pointed portions thereof extending between an annular slot 430 of a collar 431 fixed to the shaft 414, a coil spring 432 having one end secured to the side wall of the carriage and the other end secured to the member 429 midway between its pivotal mounting to the carriage and the point received within the slot of the collar 431. It will be seen that this arrangement provides an over-center mechanism with the spring 432 being effective, in FIG. 21, to constantly urge the member 429 in a clockwise direction and which, through its engagement with the collar 431, insures that the half nut 418 will be held in positive engagement with the screw 419 during movement of the carriage. Upon movement of the knob 413, and thereby the shaft 414 and collar 431 with the half nut 418, in a direction outwardly of the housing, the member 429 will be rotated in a counterclockwise direction to cause the spring to be moved over-center of the pivotal connection of the member 429 to the carriage to provide a positive force effecttively maintaining, through the connection of the member 429 with the collar 431, a constant pressure on the shaft 414 to maintain the half nut 418 disengaged from the threaded shaft 419. Thus, inadvertent reengagement of the half nut and threaded shaft is positively prevented when the carriage is manually adjusted along its linear path and making it unnecessary for the operator to maintain a constant releasing pressure on the knob 413 once the knob has been moved outwardly to release the driving connection between the half nut 418 and the shaft 419.

As shown in FIG. 21, the carriage 417 has secured to its bottom surface a plurality of downwardly extending electricity-conducting brushes or contacts 433, 434, 435 and 436 in spaced relation to each other. More particularly, and as shown in FIGS. 21 and 22, each of these contacts 433–436, inclusive, comprises a spring-pressed plunger received within a casing, the plungers having engagement with four elongate tracks respectively designated 437, 438, 439, and 440 of electricity-conducting material, forming a programming plate assembly generally designated at 441. The four tracks are insulated from each other by rubber or plastic strips 442, the tracks and insulating strips being connected together by nut and bolt assemblies as indicated at 443 to form a unitary plate assembly, as shown in FIG. 22. The plate assembly is removably secured to the bottom wall 421*a* of the housing 422 in any suitable manner with the tracks 437 to 440 being respectively aligned with the brushes 433 to 436.

The plate 441 also comprises programming elements determinative of the cycles of operation of the washing machine and, for this purpose, the tracks 437 to 440 are provided with a plurality of electrically insulated strips 445 and electricity-conducting strips 446, the shaded strips in FIGS. 20 and 22 designating the insulated portions of the track and the unshaded strips indicating the electricity-conducting elements of the tracks. Upon movement of the carriage 417 longitudinally of the controller, the spring-pressed plungers of the contacts 433, 434, 435, and 436 will travel over and engage the respective linearly arranged and aligned insulated and electricity-conducting strips of the tracks with the contacts cooperating with the strips of the tracks to provide a programming arrangement effective to control the cycles of operation of the washing machine as indicated by the indicia 411 on the indicating panel 410 of the controller. For this purpose electric current is conducted to various electrically-operated components of the washing machine by conductors in the form of wires connected to the carriage 417 and the plate 441. For example, electric current can be conducted into the carriage through the conductor 444 to wires extending and connected to the contacts 433–436 on the carriage to cause electric current to flow to these contacts continuously so that, upon linear movement of the carriage 417, the plungers of the contacts 433–436 passing over the electrically-insulated and conducting strips of the tracks of the plate 441 will provide a combination of circuits effective to cause one or more of the electrically-operated components of the washing machine to operate to provide the sequential cycles of the machine. More particularly, the negative conductor 444 can be directly connected to the carriage and the lead from this conductor is contained within the carriage 417 and connected to each one of the contacts as indicated at 444*a*. The conductors or wires from the programming plate 441 are indicated at 446*a*–446*d*, respectively, and may be considered the respective female plug members that the wires are connected to the various electrical component parts of the washing machine, such as the washing machine motor, the controller motor, the solenoid-operated hot water valve, and solenoid-operated cold water valve, and the spin solenoid.

It will be apparent that there are features of the sequential controller described with reference to FIGS. 19–22, inclusive, that are similar to the sequential controller described in FIGS. 1–18, inclusive. More particularly, there is a carriage driven by a manually-controllable half nut controlled by the operator through a knob to readily disconnect and connect the carriage positively to the drive shaft for controlling travel of the carriage, the carriage being disconnected from the driving shaft for movement manually in either direction along the drive shaft, upon connection of the carriage and drive shaft by manual operation of the control knob, movement of the carriage is effected by the controller motor to complete the entire sequential cycles of operation of the washing machine, or, alternatively, selection of a desired cycle of the washing machine. Further, the cycles of operation of the washing machine are controlled by its electrical components through the medium of the contact arrangement provided by the programming elements carried by a removable plate, which is mounted on the bottom wall of the housing to permit its ready removability from the housing. This feature has the specific advantage of providing a universal sequential controller particularly desirable in washing machines, and other appliances, by the mere substitution of plates having specific desired programming elements particularly adapted to control the household appliance desired to be operated. More particularly, the removable back plate permits universal application of the main body of the controller to different appliances as it is merely necessary to remove and substitute another back plate having different selected sequences of operation and without necessitating redesigning the entire structure and changing the entire structure to accommodate a change in cycles of operation. This feature is of particular advantage in the automatic washing machine industry where it may be desired to change a particular sequence of operation of a cycle of a washing machine due to model changes or changes in the length of the washing cycle, for example.

FIGS. 23 to 33 illustrate another form of sequential controller embodying the invention. This embodiment of the invention differs from the preceding described sequential controllers by the provision of a programming plate formed of electrical insulating material and having a plurality of movable electrical contacts disposed beneath and in alignment with spaced slots in the plate, there being a plurality of spaced sets of slots and contacts with each set being arranged along a linear path, the slots of the sets receiving spring-loaded fingers, formed of electrical insulating material, carried by a carriage movable along a linear path by a threaded drive shaft to cause operation of the electrical contacts in a manner to provide a desired sequential control of the cycles of the washing machine, or other appliance, during travel of the carriage. The controller also is characterized by the feature of providing a rotatable knob controlling carriage mechanism effective to move and position the fingers to operate as actuators for moving the contacts into engagement with each other or to disengage the contacts from each other or to move the fingers to a retracted non-operating contact position.

A further feature particularly characterizing this embodiment of the invention is that all of the electrical contacts are contained on a removable programming plate with the particular slot arrangement of the plate providing portions between the slots serving as cams to move the carriage fingers into and out of engagement with the electrical contacts during linear travel of the carriage. In addition, the carriage also contains latch mechanism for coupling and uncoupling the carriage from the drive shaft of the controller and being effective to simultaneously uncouple the drive between the carriage and the drive shaft and to raise the carriage fingers to break any electrical circuits that may be established to the various electrical component parts of the washing machine instrumental in its operation.

More particularly and referring to FIG. 23, the sequential controller comprises a panel 510 having affixed thereto indicia 511 identifying various sequences of the automatic cycles of the washing machine. A control knob 512 is provided with a pointer 513 indicating the position of the control knob with respect to the indicia on the panel 510 during travel of the knob by movement of the carriage. Referring to FIGS. 24 and 30, the knob 512 is secured to a shaft 514 forming a portion of the linearly movable carriage 519. The panel 510 and the front wall 515 of the housing, generally indicated at 516, having aligned slots 517 and 518 receiving and permitting movement of the shaft 514.

Referring now particularly to the construction of the carriage 519, the carriage comprises a U-shaped member 520 having, as seen in FIG. 30, a bottom wall 521 and spaced side walls 522, 523, the bottom wall having a tubular portion 524 secured thereto and surrounding and slidingly engaging a threaded drive shaft 525 for movement of the carriage longitudinally of the shaft.

The carriage also comprises actuating mechanism provided by a channel-shaped member 526 having its opposite side walls extending along the side walls 522 and 523 of the member 520 and disposed outwardly thereof, the shaft 514 extending through and being rotatably supported within the side walls 522 and 523 of the U-shaped member 520. The shaft also extends through the end portions of the side walls of the member 526 for pivotally supporting the member 526. The channel member 526 is provided with a pin 527 extending through and secured to opposite side walls thereof and on which are mounted a plurality of L-shaped members in the form of fingers 528, four of these fingers shown in FIGS. 24 and 30 being pivotally mounted on the pin 527 and spaced from each other by collars 529. The fingers 528 are formed of plastic or other electrical insulating material. One of the fingers is shown in greater detail in FIG. 33 and it will be seen that the upwardly and outwardly projecting tip 530 thereof is adapted to engage a pin 531 extending between and fixed to the upper portions of the side walls of the carriage member 520 by a tension spring 532 having several coils wrapped around a collar 529 positioned on the pin 527, one end **532*a* of the spring bearing against pin 531 and the other end 532*b* of the spring underlying and engaging the finger 528 to maintain the finger constantly in engagement with the pin 531 secured to the U-shaped member 520**.

It will be apparent from an inspection of FIGS. 31 and 33, rotation of the control knob 512 and shaft 514 in a counterclockwise direction will cause the channel member 526 to also move in this direction from the position shown in FIG. 31 to the position shown in FIG. 33 to move the pin 527 downwardly and toward the left. This movement of the pin 527 will cause the finger to be also moved downwardly due to the cam action of the surface **530*a* of the finger slidingly engaging the pin 531 for effecting movement of the finger as described. Rotation of the shaft 514 in a clockwise direction as seen in FIG. 33 will cause the finger 528** to be moved to the position shown in FIG. 31.

The carriage 519 is adapted to be coupled to the threaded shaft 525 which is rotatable to move the carriage in a linear path. The threaded shaft 525 is shown more clearly in FIGS. 24 and 25 and has one end provided with an axially located opening for receiving a pointed screw 534 threaded into a nut 535 positioned within and secured to the side wall 536 of the housing 516, a nut 537 being threaded on the screw 534 and serving as lock washer to maintain the screw 534 against unwanted rotation, the opposite end of the shaft is pointed for reception within a hollow boss of the wall 539 of the housing providing a bearing for supporting and rotatably mounting the shaft. The shaft 525 is rotated by a reduction gear arrangement in the form of a gear 540 secured to the shaft adjacent the wall 539 of the housing and meshing with a gear 541 supported on the shaft of a synchronous motor generally indicated at 538.

Referring to FIGS. 24 and 30, the carriage is coupled to the shaft 525 for movement longitudinally thereof by a latch mechanism having a lever 542 pivotally connected at 543 to a laterally and outwardly extending portion or tab forming a portion of the side wall 522 of the carriage member 520, the lever 542 being movable into a slot 544 (FIG. 25) formed in the tubular member 524 and extending into and through an elongate slot 545 formed in the side wall 523 of the carriage member 520 to permit upward pivotal movement thereof. The lever 542 is provided with an arcuate notch adapted to be received between and engage the threads of the shaft 525 for effecting a driving connection between the shaft 525 and the carriage 519.

Movement of the lever 542 into engagement with the shaft 525 and out of engagement with the shaft 525 is provided by a pawl 546 secured to one end of the shaft 514 rotatable by the knob 512, the pawl 546 having two laterally extending actuating portions **546*a* and 546*b* so that, as shown in FIG. 31, the portion 546*a* will hold the lever 542 in engagement with the threads on the shaft 525 to effect longitudinal movement of the carriage in a linear path along the axis of the shaft. In FIG. 31, upon rotation of the shaft 514 by the knob 512 in a clockwise direction, the portion 546*a* of the pawl 546 will also be moved in a clockwise direction and the portion 546*b* of the pawl will engage and lift the lever 542 away from and out of engagement with the shaft 525** to release the driving connection between the carriage and the shaft, as shown in FIG. 32.

Accordingly, it will be apparent from the description of the carriage component parts, including the latch mechanism, that, upon rotation of the knob 512 and thereby the shaft 514 in a clockwise direction (FIG. 31) the fingers will be moved to their raised positions and the latch mechanism will be effective to provide a driving connection between the carriage and the shaft 525. It will be equally apparent that, upon rotation of the shaft 514 and knob 512 in a counterclockwise direction, the latch mechanism will be disengaged from the shaft 525 to release the driving connection between the carriage and the shaft 525 and also that the fingers 528 will be moved to their lower positions, as shown in FIG. 33.

To ensure that the latching mechanism and the fingers 528 will maintain the positions respectively shown in FIGS. 31 and 33 upon rotation of the knob 512 as previously described, the pawl 546 is provided with an outwardly projecting pin 547 located on the portion **546*b* of the pawl and receiving one end of a helical spring 548 having its opposite end connected to an outwardly extending tab 549 projecting from one of the side walls of the channel member 526 as shown in FIGS. 30, 31 and 32. The spring 548 serves to motivate and positively maintain the channel member 526 in the position shown in FIG. 31 to ensure that the fingers 528 are maintained in yielding resilient position by the tension springs 532 while the pawl 546 will positively hold the latch lever 542 in engagement with the shaft 525 for movement of the carriage along the shaft. In view of the location of the parts and the position of the spring 548 with respect to the pawl 546 and the channel member 526** of the carriage, the spring is effective to provide an over-center arrangement upon rotation of the knob to either of its positions shown in FIGS. 31 and 32. Accordingly, when the housewife disengages the latching mechanism of the carriage from the threaded shaft 325 to move the carriage to different locations on the shaft 525 for providing a desired cycle of washing machine operation, the fingers 528 will also be retracted for a purpose now to be described.

As previously generally described, the fingers 528 are effective to open and close electrical contacts provided on a panel formed of electrically insulated material. The panel 550 is clearly shown in FIGS. 26 and 30 and comprises a flat plate having a plurality spaced sets of slots 551 disposed in alignment with the tips of the fingers 528 so that, upon carriage travel, the tips of the fingers will ride along the bottom surface of the plate as shown in FIGS. 27 and 29 until received within the slots 551 to actuate a plurality of electric contacts, as indicated at 552, to open or close electrical circuits.

As seen in FIGS. 26 to 29, the movable contacts 552 on the panel comprise any type of electrical contacts instrumental in providing electrical circuits for operation of the washing machine, or other appliance, the slots being arranged with respect to the contacts that the fingers actuate one or more of the contacts at a particular desired time to complete or open an electric circuit or circuits to the various electrically-operated component parts of the washing machine. The contacts are connected to strips of brass, or other conducting material, designated at 554. It will be noted from an inspection of FIG. 26 that these strips are formed to terminate at the rear of the sequential controller and are provided with screws to permit conductors to be attached thereto and leading to the respective electrically-operated components of the washing machine for actuation thereof at periodic intervals as controlled by the movement of the carriage and the actuation of the contacts by the fingers. FIGS. 26 to 29 illustrate the way the fingers may cause flexible portions of strips to open or close contacts to cause current to cease to flow or to flow through one or more of the electric circuits provided by the strips to one or more electrical components of the washing machine.

In the position shown in FIG. 33, the fingers have been moved to a position where they are ineffective to engage the panel 550 or to enter the slots therein to either open or close the electrical contacts located above the panel. This position of the fingers is attained upon rotation of the knob 514 to disengage the carriage from the drive shaft 525 and simultaneously to move the fingers outwardly and away from the panel, from the position shown in FIG. 31 to the position shown in FIG. 33, to break all electrical circuits as the fingers are moved away from the panel 550, the fingers cannot engage the slots in the panel, and, accordingly, there is no possibility of breaking the fingers during movement of the carriage longitudinally of the shaft 525 by the housewife. While the circuit arrangement for controlling the various operational cycles of the machine have not been particularly pointed out in connection with this modification of the sequential controller, it can be readily understood that the electrical contacts on the panel and also the slots in the panel can be arranged with respect to each other to provide electrical connections effective to provide any predetermined cycles of operation of the washing machine including those previously described with respect to the embodiments identified in FIGS. 1 to 18, inclusive. It is to be particularly noted that the terminal board or panel serves as a cam to not only prevent the spring-operated fingers from entering into the slots but also to permit the fingers to enter the slots to operate the electrical contacts mounted on the terminal board. It is to be understood that, when the fingers are retracted to a position below the panel, the line circuit is opened so that there is no possibility that electric current can be conducted through the contacts of the controller.

The overcenter spring arrangement of the latch mechanism is effective upon manual rotation of the knob to either hold the latch mechanism and finger-operating mechanism in disengaged position or engaged position and provides a positive force to these mechanisms which must be overcome by physical effort of the housewife, a feature insuring prevention of inadvertent reengagement of the drive arrangement of the carriage with the constantly rotating threaded shaft during manual adjustment of the carriage along the linear path of travel and also making it unnecessary for the operator to maintain a constant releasing pressure on the knob once the same is being released for such adjustment.

As shown in FIG. 30, the panel 550 is connected at opposite side edges to the front and back walls of the housing by a bracket 555 secured to the front wall of the housing by a weld and the opposite side of the panel is supported on and engages an inturned flange 556 on the back wall of the housing which, as shown in FIG. 30, is cut away to permit the panel to be removed and another panel inserted having different electrical contacts and slot arrangements for readily providing a programming arrangement for other and different appliances or for changing the program of cycles of the automatic washer. The back panel is secured to the flange 556 by a plurality of screws 557 extending through the back panel and threaded into the flange 556, there also being screws 558 which extend through the other edge of the panel for securing the panel to the bracket 555 by insertion of a screw driver through openings in the top wall of the panel for engagement with the screw heads.

FIGS. 34 to 40, inclusive, illustrate a further modification of the sequential controller embodying the invention. The sequential controller comprises a front panel 610 having indicia 611 to indicate time and the different cycles of operations of the washing machine. Projecting through a slot 612 in the front panel is a shaft 613 having a knob 614 secured thereto, the shaft extending through aligned slots 612 and 615*a* respectively located in the panel 610 and the front wall 615*b* of a housing, generally indicated at 615, of rectangular box like form and into and through a carriage, generally indicated at 616, supported and driven by a screw-threaded drive shaft 617 for movement longitudinally of the shaft.

As seen in FIGS. 36 and 37, the drive shaft 617 has one end thereof mounted within a bearing 618 connected to a bracket 619 secured to the side wall 620 of the housing 615, with the opposite end of the shaft being positioned within a bearing 621 connected to a similar bracket 622 secured to the side wall 623 of the housing 615, the bearing 618 and 621 permitting rotation of the drive shaft 617 by a crank arm 624 having a pin 625 positioned within an opening in a wheel 626 secured to the end of the drive shaft projecting from the bearing 621. The crank arm 624 is connected to the drive shaft of a synchronous motor 624*a* continuously operative to rotate the shaft 617 during operation of the washing machine. As seen in FIGS. 34 and 35, the carriage 616 has secured thereto an upwardly extending pointer 627 extending through the aligned slots in the upper portion of the front wall 615*b* of the housing 615 so that the pointer 627 moves with the carriage to indicate to the housewife the particular time and operational cycle of the washing machine during operation of the washing machine.

Referring now more particularly to the carriage 616, the carriage comprises a hollow frame 628 in the form of a channel-shaped member. The drive shaft 617 extends through a cylindrical bushing 629 positioned within the frame 628 and secured thereto, the bushing 629 providing a support for the carriage on the threads of the shaft 617 throughout the linear travel of the carriage to effect the different operational cycles of the washing machine.

To effect a driving connection between the drive shaft 617 and the carriage 616, reference is made to FIGS. 38 and 39 illustrating a latching mechanism for effecting the driving connection when the shaft 613 is rotated by the knob 614. The latching mechanism is confined within the frame 628 of the carriage and is mounted on the shaft 613 and comprises a dog in the form of a lever 636 pivotally mounted on the shaft 613 and having a half nut 637 secured to one end of the lever 636 by a screw 638 and disposed with relation to the shaft 613 to engage the threads on the shaft 617 upon rotation about the shaft 613 in a clockwise direction, the half nut 637 being engaged with the threads of the shaft 617 as shown in FIGS. 38 and 39. The latch mechanism further comprises a lever 639 fixed to the shaft 613 by a screw 613*a* threaded into an opening in the lever 639 and engaging the shaft 613 so that, upon rotation of the shaft, the lever 639 will also be rotated. The lever 639 has a pin extending therethrough and projecting outwardly therefrom, the outwardly extending portions of the pin being identified as 639*a* and 639*b* and the portion 639*a* underlying a rearwardly extending portion 636*a* of the lever 636 to effect pivotal movement of the lever 636, upon rotation of the shaft 613, in a counterclockwise direction as seen in FIG. 38 to move the lever 636 and thereby the half nut 637 away from the shaft 617 to the dotted line position shown in FIG. 38 to effect disengagement of the half nut 637 from the shaft 617.

The lever 636 is urged into the position shown in FIG. 38 to engage its half nut 637 with the shaft 617, upon rotation of the shaft 613 in a clockwise direction, by a spring 640 acting to rotate lever 636 in a clockwise direction to engage the half nut on the lever with the threads of the shaft 617. More particularly, spring 640 is coiled about the shaft 613 and has one end 640*a* connected to a side wall of the frame 628 of the carriage, as shown in FIG. 36, the other and opposite end 640*b* of the spring extending and being received within a rectangular opening 642 in the side wall of the carriage frame 628 for engagement beneath the lever 636 to urge the lever in a clockwise direction to effect engagement of its half nut with the threaded shaft 617.

It will be apparent from the above description that this latching mechanism is effective to provide a drive connection between the carriage and the shaft 617 by rotation of the knob 614 and thereby the shaft 613. In the operation of the knob 614 and referring to FIG. 38, rotation of the knob in a counterclockwise direction will cause the lever 639 to be rotated about the shaft 613 to move the pin connected thereto upwardly to engage the pin with the projecting portion 636*a* of the lever 636 to thereby move the lever 636 in a counterclockwise direction to disengage its half nut 637 from the threaded shaft 617 and to move it to the dotted line position. To reengage the half nut 637 with the threaded shaft 617 to provide the driving connection of the carriage and the shaft, rotation of the shaft 613 in a clockwise direction will move the lever 639 to move the pin portion 639*a* downwardly thereby causing the spring 640 to move the lever 636 in a clockwise direction to engage the half nut 637 with the threaded shaft 617 and move it to the full line position shown in FIGS. 35 and 39. The spring 640 is always under constant tension and will attempt to urge the half nut 637 into engagement with the drive shaft 617 so that removal of the restraining influence of the lever 639 on the lever 636 will cause the spring to operate to provide a driving connection between the carriage and the shaft 617. It will be noted that, upon disengaging rotation of the knob 614, the lever 639 serves, through its pin, to positively maintain the half nut on the lever 636 disengaged from the drive shaft so that there is no possibility of ratcheting of the half nut on the shaft by linear travel of the carriage along the shaft by operation of the housewife.

The sequential controller is particularly characterized by the provision of an electrical control arrangement for effecting the energization of the electrical component parts of the washing machine instrumental in providing the desired washing cycle of the washing machine. Referring to FIGS. 35 and 36, the carriage is provided with a microswitch 643 secured in any desired manner between and to the side walls of the frame 628 of the carriage 616. The microswitch is of conventional form including a contact button 644 projecting downwardly and outwardly of the switch and adapted to actuate electrical contacts within the switch to complete an electric circuit upon movement of the button 644 by a lever 645 of resilient material having one end secured to the switch and the other end provided with a roller 646 engaging a linear cam track or profiled programming element 647 mounted on the bottom wall 648 of the housing 615 as shown in FIG. 36. Nut and screw assemblies 649 adjustably secure the cam track to the housing bottom wall 648. The cam track 647 is provided with a plurality of dwell and rise portions 647*a* and 647*b* adapted to open and close the electrical contacts of the microswitch 643 upon the roller 646 riding over the cam track during linear movement of the carriage. The electrical contacts of the switch 643 may be disengaged during movement of the roller 646 into the dwell portions 647*a* of the cam track and may be engaged upon movement of the roller along the raised portions 647*b* of the cam track.

The microswitch 643 has its electrical contacts connected to current-carrying conductors in the form of trailing loose wires 643*a* and 643*b* connected to electrical components of the washing machine to effect sequential operation of these electrical components as desired during the cycles of operation of the washing machine.

The electrical control arrangement also comprises a microswitch 650 carried by a bracket 651 secured to a side wall of the carriage and positioned as shown in FIGS. 36, 37, and 40, the microswitch having a button 652 extending outwardly therefrom and movable to engage and disengage electrical contacts within the microswitch upon rotation of a switch lever 653 pivotally mounted on the control knob shaft 613 of the carriage and adapted to engage and move the button 652 to a switch-open position upon rotation of the knob 614 to disengage the half-nut 637 from the threaded shaft 617. The switch 650 has electrical connections to the switch 643 and, when the contacts of the switch 650 open, line current will cease to flow to the electrical contacts of the microswitch 650. The microswitch 650 has trailing wires 654 and 655 for conducting line current thereto, and which extend outwardly of the controller. It will be noted from an inspection of FIGS. 35, 36, 37 and 40 that the switch lever 653 is connected to the shaft 613 controlled by the knob 614 so that, upon rotation of the knob in a clockwise direction as viewed in FIGS. 34 and 36, the shaft 613 will move the lever arm 653 to a position permitting the button 652 to be moved outwardly by a spring (not shown) to close the electrical contacts of the switch 650 to conduct electrical current to the microswitch 650 and thereby to the miroswitch 643, rotation of the shaft 613 and knob causing a driving connection to be established between the shaft 617 and the half nut 637 to effect movement of the carriage from left to right as viewed in FIG. 36.

Referring to FIGS. 35, 36 and 37, a microswitch 657 is located at the right hand end of the housing 615 and, as shown in FIG. 36, the microswitch is securely held to the housing by a bracket or other means and has a button extending therefrom for controlling a pair of electrical contacts within the switch connected in series to exterior conductors providing line current to the switch 650 and motor 624*a*. The contacts of the switch 657 are normally closed but will open to remove current from the switch and to shut off the controller motor at the end of the washing cycles by engagement of the arm 658, extending laterally of the carriage 616 (FIG. 37), with the button on the microswitch 657 when the carriage has completed its travel along the shaft 617. The microswitch 657 thus acts as an off-on limit switch to insure that current is removed from the sequential controller at the conclusion of the cycles of operations of the washing machine.

In the operation of this sequential controller, with the parts positioned as shown in the drawings, the electrical contacts of the microswitch 650 will be closed, and as the electrical contacts of the limt switch 657 are also closed, current will be conducted to the microswitch 643. As the synchronous motor **624*a* will be operative at this time, the carriage 616 will travel in a linear path along the shaft 617 with the contacts of the microswitch 643 thereafter being opened and closed depending upon the particular positions of the rollers 646 in the rise and dwell positions of the cam track 647 to provide the cycles of operation of the washing machine. As the carriage 616 approaches its limit of travel along the shaft 617, the arm 658 on the carriage will cause the electrical contacts of the microswitch 657 to open to prevent the flow of current to the microswitch 643 and to the motor 624*a*** to discontinue operation of the sequential controller and washing machine.

In the event that the program is to be interrupted at any time to change the program during linear travel of the carriage, the operator merely rotates the control knob 614 in a counterclockwise direction as seen in FIG. 34 whereupon the latching assembly, providing a drive between the carriage and the screw shaft, will be moved from its shaft-engaging position to the position shown in dotted lines in FIG. 38 to disengage the half nut 637 of the latching mechanism from the shaft 617 to permit the carriage and all of its component parts to be freely moved along the shaft 617 by manual operation to any position desired along the front panel and the indicia disposed thereon. Under these circumstances, actuation of the off-on switch 650 will cut off the current to the controller as the lever 653 on the carriage is actuated to open the electrical contacts of the switch 650 mounted on the carriage.

It is to be understood that, while a single microswitch is shown mounted on the carriage and also a single cam track is illustrated to show the principle of operation of the sequential controller, the controller is readily adapted for use with multiple microswitches and cam tracks cooperating therewith to accomplish any desired number of sequential cycling operations. In such arrangement, the microswitches would be mounted in side-by-side relation and movable along a plurality of programming elements or cam tracks adapted to operate the microswitches for various sequences. When it is desired to change a portion of the program of the controller it is necessary to only rotate the control knob to provide a mechanical disconnection of the carriage from the screw-threaded shaft and also to provide an electrical disconnection of the current to prevent hunting of the device. More particularly, if the current is not disconnected and the operator moves the carriage rapidly linearly in either direction, the controller would pass through the various cycles very rapidly and the washing machine would, of necessity, also go through its various cycles rapidly and possibly hunt for a position of operation. This is even more critical when the carriage is moved in its reverse direction, because the component parts of the washing machine are not set for operation accurately.

It will be apparent that the cam track 647 may be readily removed and other and different cam tracks positioned in place thereof to provide different sequences of operation of the washing machine, or other household appliances which may be adaptable to the use of a sequential controller as shown in this embodiment of the invention.

*Conclusion*

The instant sequential controllers being formed of simple parts and readily available materials lends itself to mass production manufacturing principles, thus affording a substantial saving in the manufacturing costs.

From the foregoing disclosure, it may be observed that I have provided improved sequential controllers which efficiently fulfills the objects thereof as hereinbefore stated and which provides numerous advantages which may be summarized as follows:

(1) Structurally simple, efficient and durable;

(2) Economical to manufacture and readily adaptable to mass production manufacturing principles; and (3) The provision of improved sequential controllers having indicating mechanism movable in either direction in a linear path for setting up in advance a program of operation, said sequential controllers having indicating means movable in a linear path in either direction for convenient visual review, and said sequential controllers having readily interchangeable program regulating elements so that basic parts of the contemplated sequential controllers may be employed with different program regulating elements without necessitating a complete rebuilding of the basic sequential controller mechanisms.

While I have illustrated preferred embodiments of my invention, many modifications may be made without departing from the spirit of the invention, and I do not wish to be limited to the precise details of construction set forth but wish to avail myself of all changes within the scope of the appended claims.

I claim:

1. In a circuit controller having linear movable circuit-controlling means in engagement with a linearly arranged stationary cam profile and motor means for effecting linear movement of said controlling means, manually operable latch means actuatable to a position effecting disconnection of said circuit-controlling means from said motor means simultaneously with effecting disengagement of said circuit-controlling means from said cam profile means to facilitate manual movement of said cir- circuit-controlling means in a linear path in either direction, and means releasably holding and maintaining said latch means in said position.

2. A drive mechanism for a sequential controller comprising a threaded rotatable shaft, motor means to cause rotation of said shaft at a constant speed, a linearly arranged dial including a position indicating means linearly movable along said dial, a carrier having circuit-controlling means and also positive latch means operable to effect or to disconnect a mechanical driving engagement between said carrier and said threaded formations of said rotatable shaft to render said circuit-controlling means effective or ineffective, linkage means between said carrier and said position indicating means, said driving connection being effective to move simultaneously said position indicating means and said carrier linearly axially of said rotatable shaft at the same rate of speed throughout the linear movement of said carrier, and said driving connection including manually operable means of said latch means operable to disconnect and releasably hold disconnected said driving engagement whereby the carrier and said position indicating means may be moved independently in either direction linearly axially of the shaft.

3. In a control device having switch means, stationary linear cam means for controlling operation of said switch means, an actuator for said switch means and engageable with said cam means for causing the operation of said switch means, a motor, and connections between the motor and said actuator for driving said actuator linearly in one direction at the same rate of speed throughout the linear movement of said actuator, an indicating knob, and connections between said knob and the actuator to effect disengagement of the actuator and the connections between the motor and the actuator, whereby the actuator may be moved in either direction independently of said motor, said indicating knob also being operable to effect reengagement of said connections whereby said actuator may complete linear movement to complete sequential operation of the switch means.

4. In a sequential controller, the combination of rotary driving means including a motor, a linearly arranged stationary cam profile, a manually reciprocable carrier mounted in said sequential controller for movement independently of said rotary driving means in either direction linearly axially of said rotary driving means, electrical contact means forming a part of said carrier and arranged for operation in a predetermined sequential control pattern, said electrical contact means including means engageable with said cam profile for controlling opening and closing of said contact means, and manually operable means arranged for linear movement with said carrier to provide a driving connection between said rotary driving means and said carrier to effect linear axial movement of the carrier at the same rate of speed throughout its travel whereby to effect operation of said control means within the predetermined sequential control pattern.

5. A circuit controller comprising: a programming member having a linearly arranged stationary cam track; a linearly movable member including means engageable with said cam track; contacts carried by one of said members and operable to open and closed positions during linear movement of said movable member; motor means for effecting linear movement of said movable member at the same rate of speed; and manually operable means for effecting disengagement of said cam track for conditioning said movable member for manual movement in a linear path in either direction independently of said motor means.

6. A circuit controller comprising: a programming member having a linearly arranged stationary cam track; a linearly movable member including means engageable with said cam track; contacts carried by one of said members and operable to open and closed positions during linear movement of said movable member; motor means for effecting linear movement of said movable member at the same rate of speed; and manually operable means for effecting disengagement of said cam track for conditioning said movable member for manual movement in a linear path in either direction independently of said motor means, said manually operable means including latch means for positively holding and maintaining said manually operable means operative.

7. In a sequential controller having a programming member having a linearly arranged stationary cam track, rotary driving means including a motor, a member movable linearly by said rotary driving means, means defining electric contacts mounted on one of said members, said contacts including means engageable with said cam track to open and close said contacts in a predetermined sequence responsive to linear movement of said movable member, and manually operable means effective to simultaneously disconnect and positively hold disconnected said rotary driving means and said movable member and to disengage and positively hold disengaged said cam track engaging means to accommodate manual movement of said movable member linearly in either direction.

8. A sequential controller comprising a stationary linearly arranged cam member; a movable member arranged to travel in a linear path along said cam member; a plurality of switches on one of said members and each switch being arranged to be operated in a different predetermined sequence, travel of said movable member controlling operation of respective switches in said different sequences; means including a rotatable shaft for effecting travel of said movable member; power operated mechanism for driving said shaft; and manual means operable upon said switches whereby the sequence of operation may be varied.

9. In a circuit controller, the combination including linear movable circuit-controlling means, said circuit controlling means being movable at the same rate of speed throughout its linear movement, a linearly arranged stationary cam profile, said circuit controlling means including means engageable with said linearly arranged stationary cam profile effective to control operation of said circuit controlling means, motor means for effecting linear movement of said controlling means, and manually operable means for simultaneously disconnecting and positively releasably holding disconnected said circuit control means from said motor means and disengaging and positively releasably holding disengaged said circuit controlling means from said cam profile means, for effecting manual movement of said circuit controlling means in a linear path in either direction.

10. In a circuit controller, the combination including linear movable circuit-establishing means, said circuit-establishing means being movable at the same rate of speed throughout its linear movement, a linearly arranged stationary circuit-controlling means, said circuit-establishing means including means engageable with said linearly arranged stationary circuit-controlling means effective to control operation of said circuit-establishing means, motor means for effecting linear movement of said movable means, and manually operable means for positively disconnecting and releasably holding disconnected said movable means and said motor means simultaneously with effecting disengagement of said movable means from said circuit controlling means, for effecting manual movement of said circuit-establishing means in a linear path in either direction.

11. A circuit controller comprising a housing including an elongated closure wall, means defining a pattern of programming cams carried by said closure wall, a carriage, means for driving said carriage within said housing and in a linear path parallel to and in juxtaposition to said wall carrying said cams, a plurality of separate circuit controlling means carried on said carriage and each inincluding actuating means engageable with and actuated by predetermined ones of said programming cams, manually operable releasable and engageable means for simultaneously effecting driving engagement of said carriage with said drive means and engagement of said controlling means with said programming cams whereby to cause the selective operation of said separate circuit controlling means in accordance with the linear position of said carriage.

12. In a circuit controller comprising a housing including means defining an opening in one side thereof and means adapted for ready mounting and replacement of a closure plate for said opening, a closure plate for said opening, means defining a pattern of programming cams carried by said plate, a carriage, means for driving said carriage within said housing and in a linear path parallel to and in juxtaposition to said wall carrying said pattern of cams, a plurality of separate circuit controlling switches carried on said carriage and each including an actuating means engageable with and actuatable by predetermined ones of said programming cams, manually operable releasable and engageable means for simultaneously effecting driving engagement of said carriage with said drive means and engagement of said controlling means with said programming cams whereby to cause the selective operation of said separate circuit controlling means in accordance with the linear position of said carriage, said arrangement thereby being particularly adaptable for the ready installation of any closure plate having any predetermined desired arrangement of programming cams.

13. In an electric circuit controller comprising means defining an elongated housing, means defining a pattern of programming cams carried on the inner wall of said housing, a carriage, means for driving said carriage within said housing in a linear path parallel to and in juxtaposition to said wall, said cams being located along said path, a plurality of circuit controlling means carried on said carriage and each including actuating means engageable with and actuated by predetermined ones of said programming cams as said carriage is moved therealong, manually operable releasable and engageable means for simultaneously effecting driving engagement of said carriage with said drive means and engagement of said actuating means with said programming cams whereby to cause the selective operation of said separate circuit controlling means in accordance with the linear positions of said carriage, said arrangement being further particularly characterized by said manually operable releasable and engageable means including means effective to both releasably hold said manually operable means in engaged position and releasably hold said manually operable means in disengaged position, whereby it requires a positive force on said manually operable means both to release the same and to cause movement thereof into engaged position, thus to prevent inadvertently re-engaging the same while said carriage is being manually adjusted along said path and making it unnecessary for the operator to maintain a constant releasing pressure on said manual means once the same has been released for such adjustment.

References Cited in the file of this patent

UNITED STATES PATENTS

| | | |
|---|---|---|
| 1,916,485 | Manrodt | July 4, 1933 |
| 2,252,154 | Baak et al. | Aug. 12, 1941 |
| 2,641,661 | Puerner et al. | June 9, 1953 |
| 2,767,263 | Macemon | Oct. 16, 1956 |